United States Patent
Park et al.

(10) Patent No.: US 12,108,267 B2
(45) Date of Patent: Oct. 1, 2024

(54) METHOD FOR REPORTING CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Haewook Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 17/768,056

(22) PCT Filed: Oct. 12, 2020

(86) PCT No.: PCT/KR2020/013865
§ 371 (c)(1),
(2) Date: Apr. 11, 2022

(87) PCT Pub. No.: WO2021/071337
PCT Pub. Date: Apr. 15, 2021

(65) Prior Publication Data
US 2023/0319605 A1  Oct. 5, 2023

(30) Foreign Application Priority Data

Oct. 10, 2019  (KR) .................. 10-2019-0125711
Oct. 10, 2019  (KR) .................. 10-2019-0125712

(51) Int. Cl.
*H04W 24/08*  (2009.01)
*H04W 24/10*  (2009.01)

(52) U.S. Cl.
CPC .......... *H04W 24/08* (2013.01); *H04W 24/10* (2013.01)

(58) Field of Classification Search
CPC ......... H04B 17/345; H04B 7/06; H04J 11/00; H04L 5/00; H04W 24/08; H04W 24/10
(Continued)

(56) References Cited

U.S. PATENT DOCUMENTS

2018/0248608 A1  8/2018  Akoum et al.
2018/0323916 A1  11/2018  Yang et al.
(Continued)

FOREIGN PATENT DOCUMENTS

WO  2018-175674  9/2018

OTHER PUBLICATIONS

PCT International Application No. PCT/KR2020/013865, International Search Report dated Jan. 22, 2021, 4 pages.
(Continued)

*Primary Examiner* — Robert J Lopata
(74) *Attorney, Agent, or Firm* — LEE, HONG, DEGERMAN, KANG & WAIMEY

(57) ABSTRACT

The present invention provides a method for transmitting or receiving CSI in a wireless communication system and an apparatus therefor. Specifically, a method for reporting CSI by a UE in a wireless communication system may comprise the steps of: receiving CSI-related configuration information from a base station; receiving a reference signal on the basis of the configuration information from the base station; measuring a crosslink interference on the basis of the reference signal; and transmitting CSI including a report about the measured crosslink interference to the base station, wherein the configuration information includes information related to the crosslink interference.

17 Claims, 17 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0228212 A1* | 7/2020 | Xu ...................... | H04L 27/2602 |
| 2021/0050983 A1* | 2/2021 | Manolakos ........... | H04W 24/10 |
| 2021/0250797 A1* | 8/2021 | Karjalainen .......... | H04L 1/0026 |
| 2021/0328746 A1* | 10/2021 | Sandberg .......... | H04W 72/0446 |
| 2022/0014298 A1* | 1/2022 | Ibrahim ............... | H04B 17/309 |
| 2022/0014954 A1* | 1/2022 | Ibrahim ............... | H04W 24/08 |
| 2022/0015114 A1* | 1/2022 | Xu ......................... | H04L 5/0073 |
| 2022/0030456 A1* | 1/2022 | Sundberg ............. | H04B 17/336 |
| 2022/0060265 A1* | 2/2022 | Xu ......................... | H04L 5/0094 |
| 2022/0247467 A1* | 8/2022 | Huang ................. | H04B 7/0626 |
| 2023/0147146 A1* | 5/2023 | Ren ..................... | H04W 56/001 |
| | | | 370/329 |

OTHER PUBLICATIONS

Zte et al., "Overview of Duplexing and Cross-link Interference Mitigation," R1-1701613, 3GPP TSG RAN WG1 Meeting#88, Feb. 2017, 12 pages.
Huawei et al., "UE-to-UE measurement for cross-link interference mitigation," R1-1801798, 3GPP TSG RAN WG1 Meeting #92, Mar. 2018, 13 pages.

* cited by examiner

[FIG. 1]
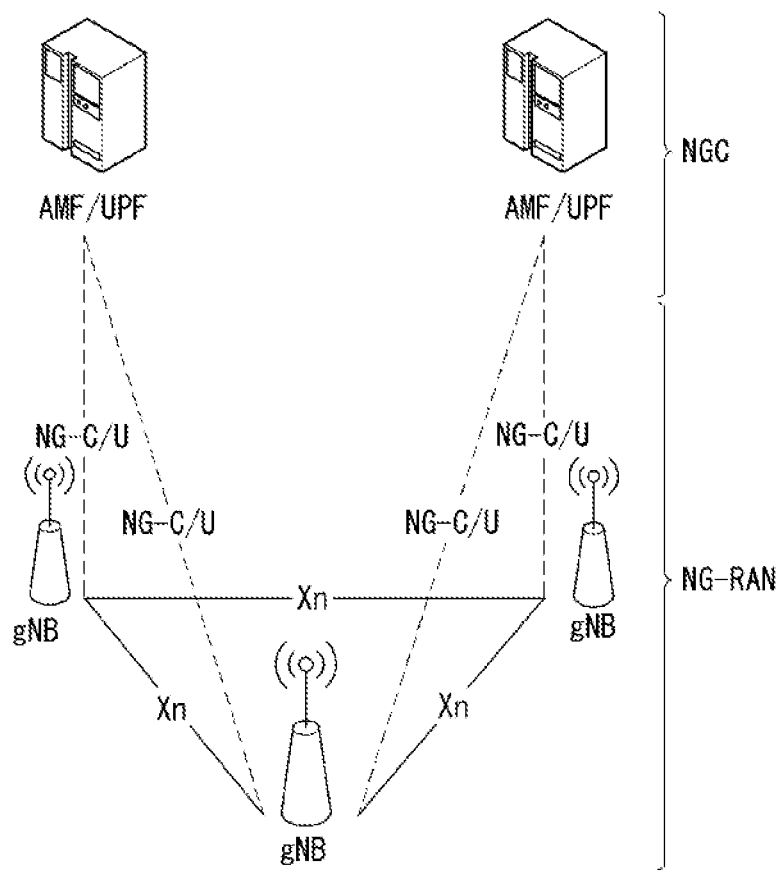
[FIG. 2]
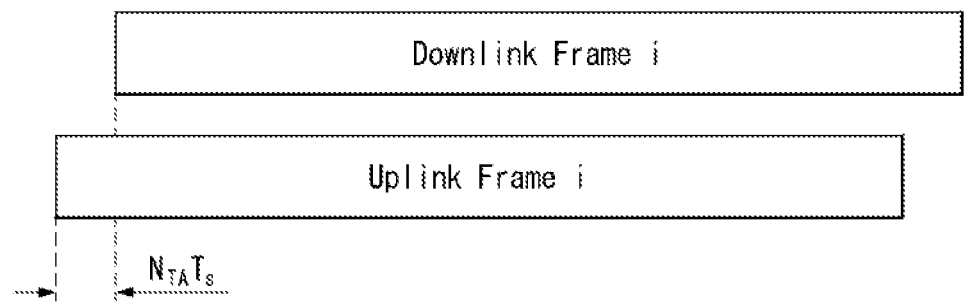

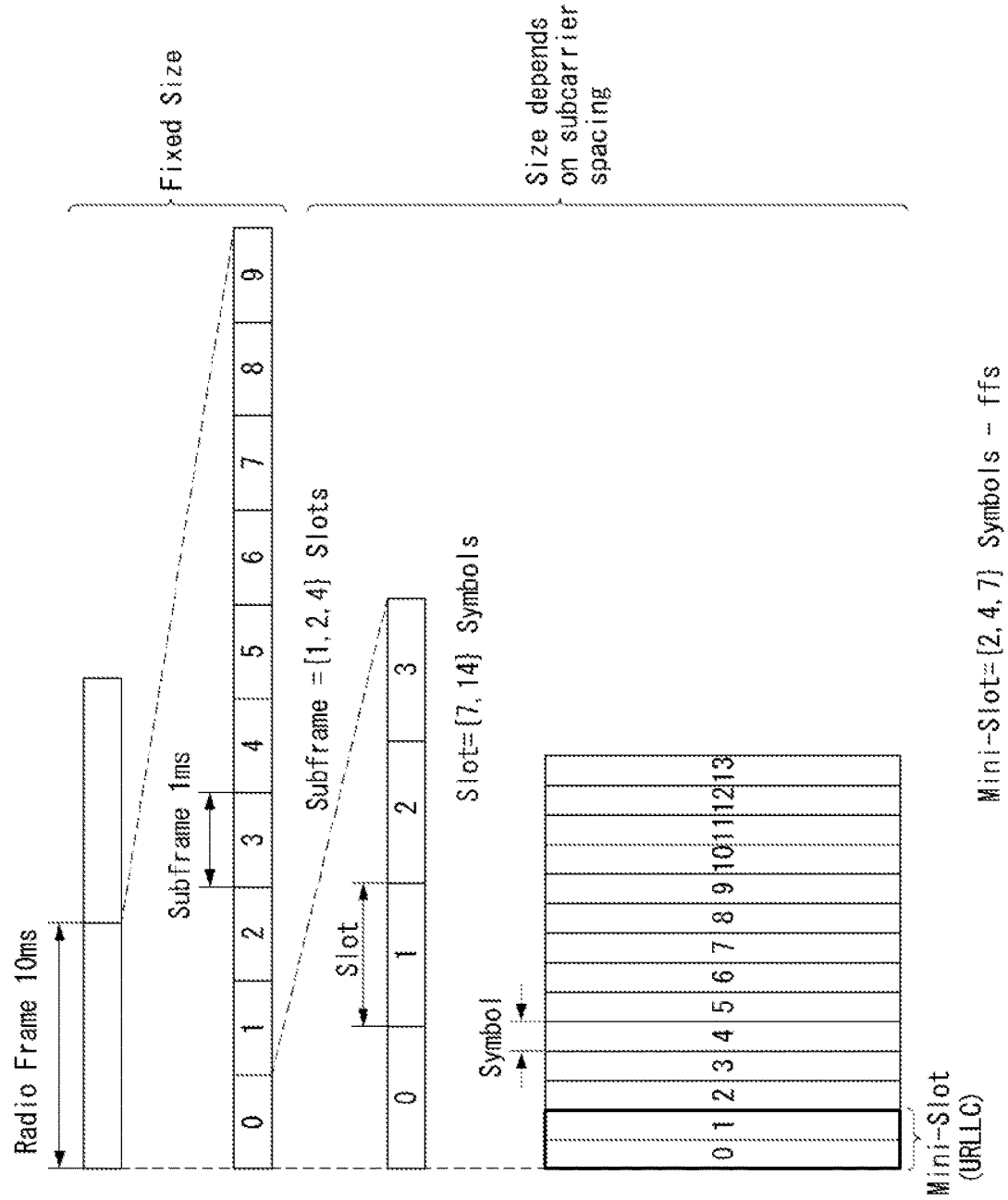
[FIG. 3]

[FIG. 4]
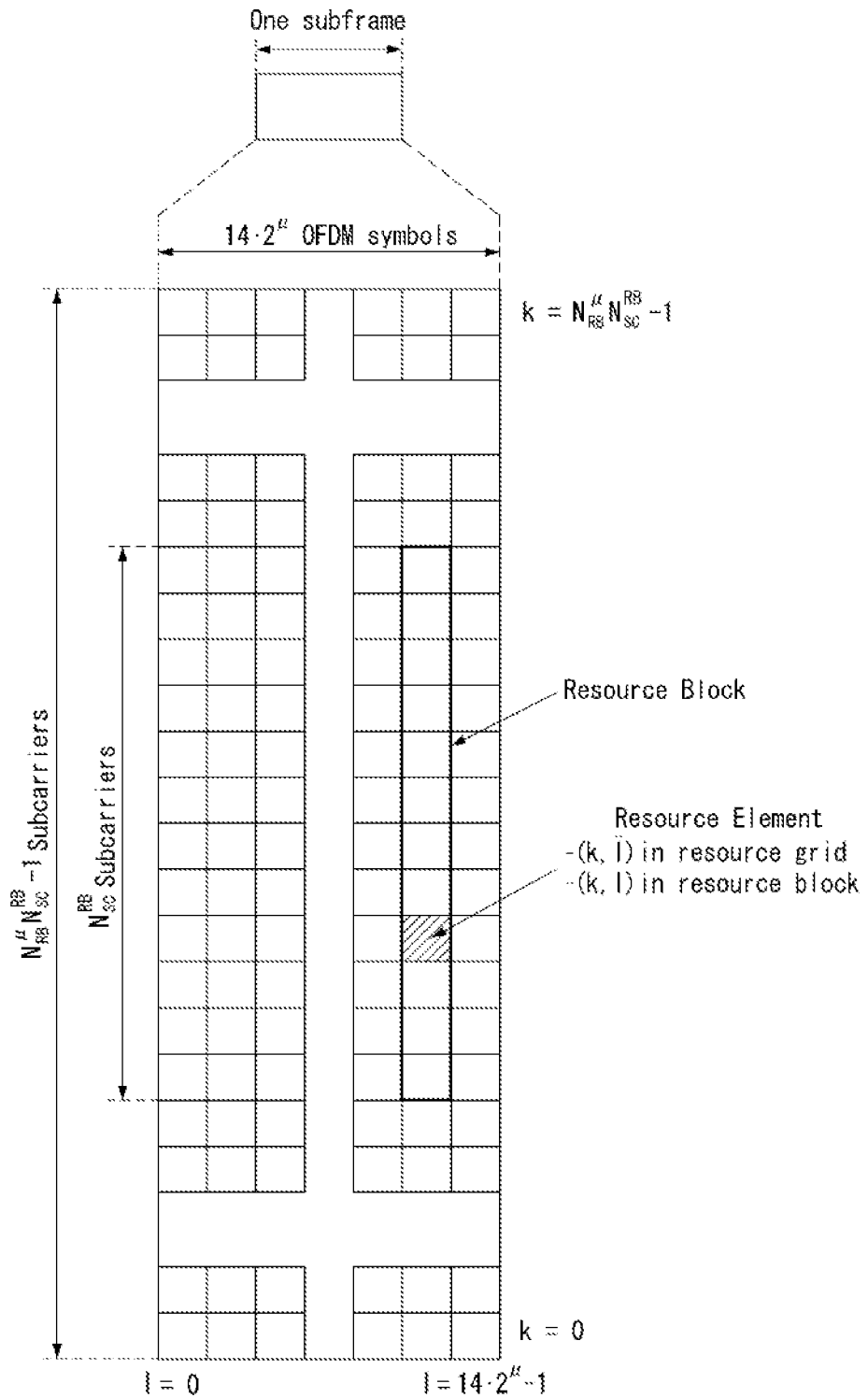

[FIG. 5]
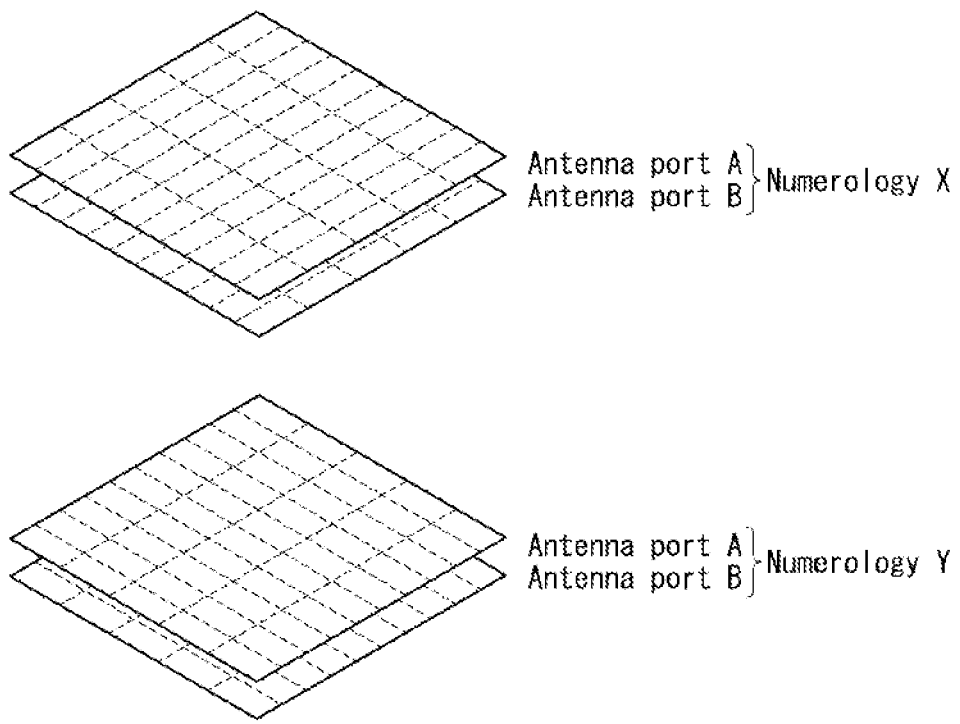

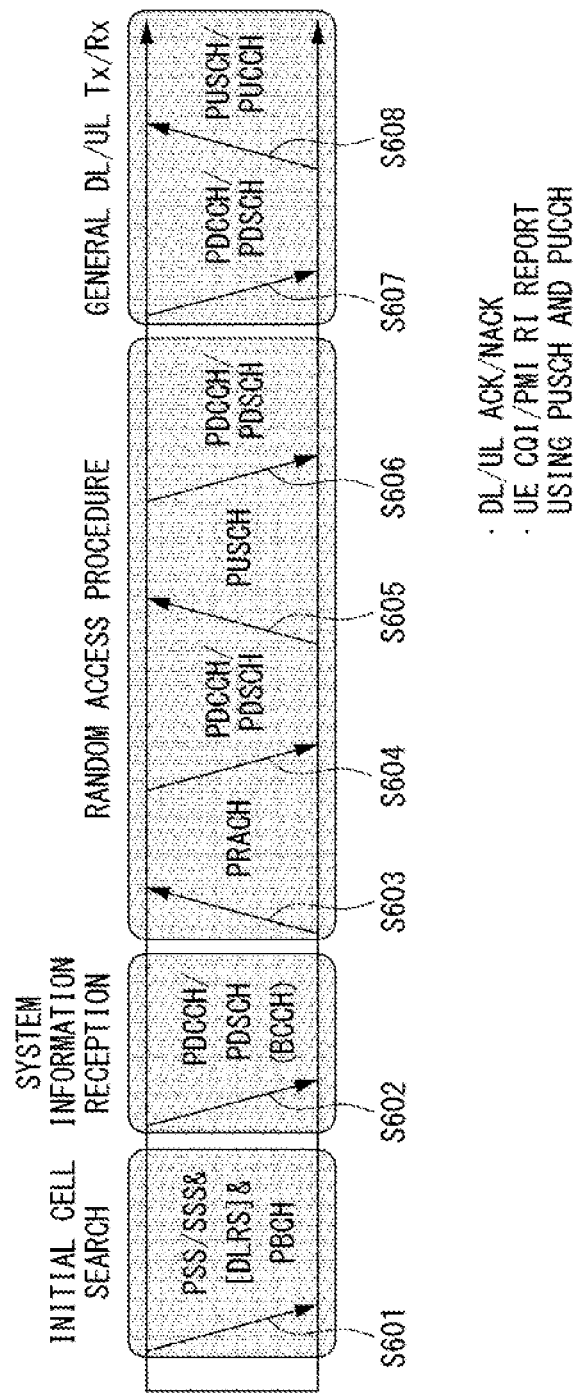
[FIG. 6]

[FIG. 7]
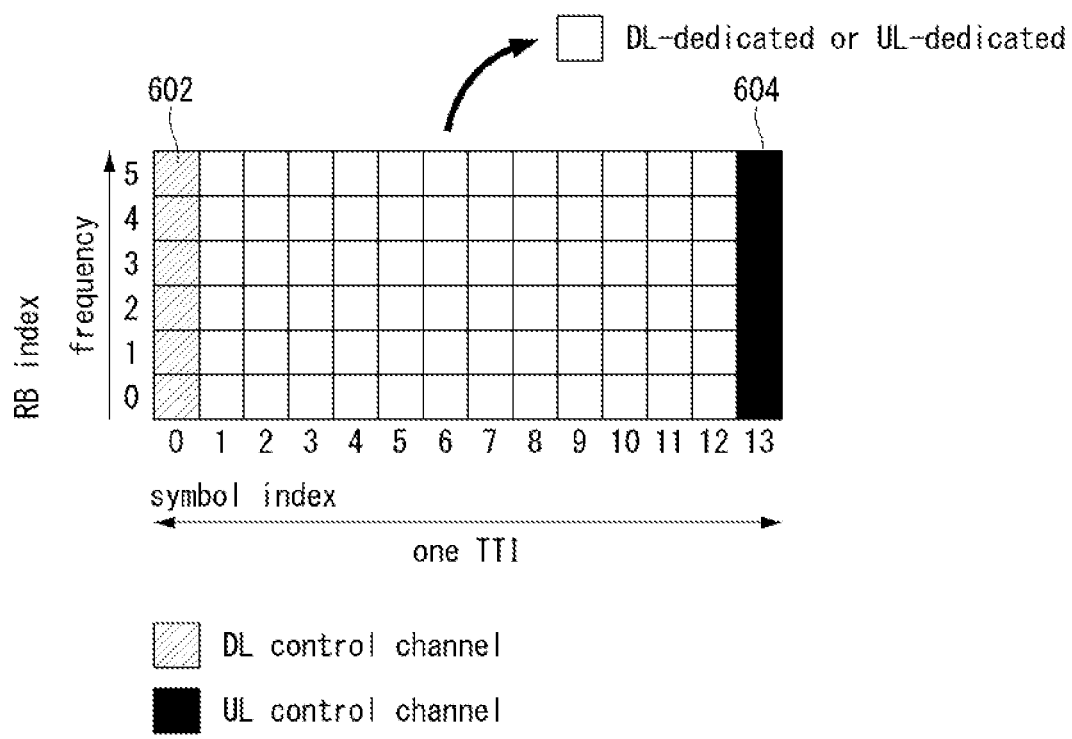

[FIG. 8]
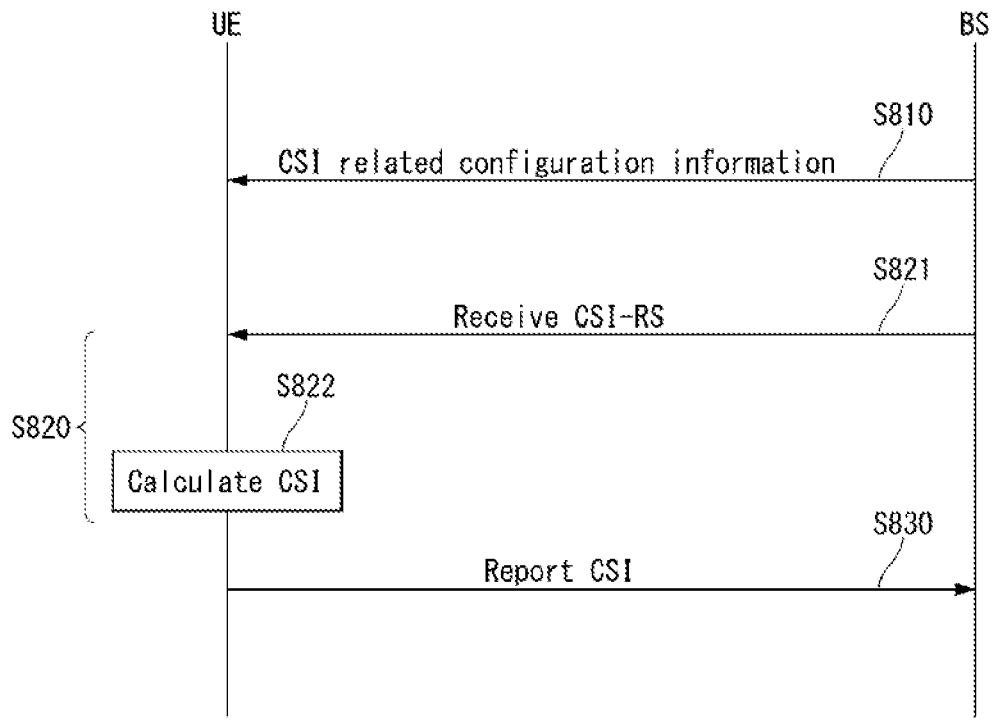
[FIG. 9]
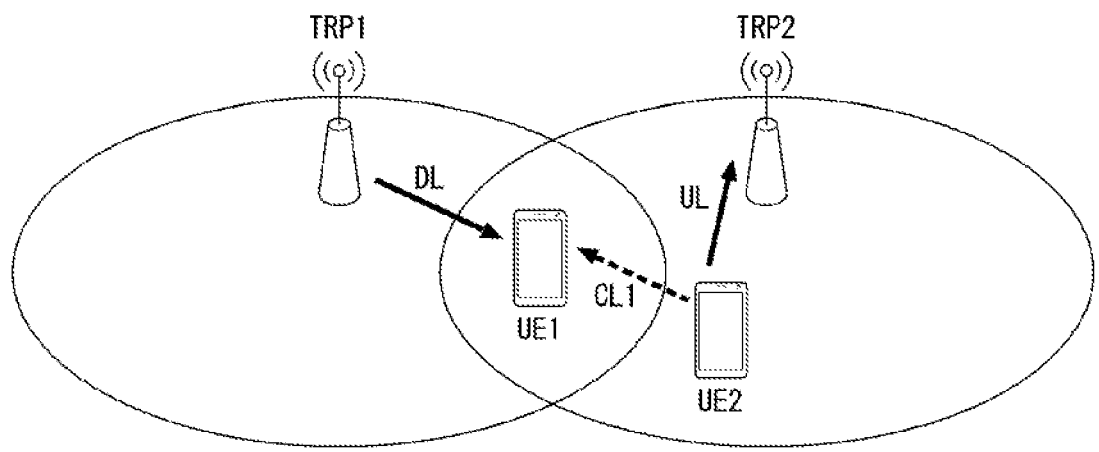

[FIG. 10]
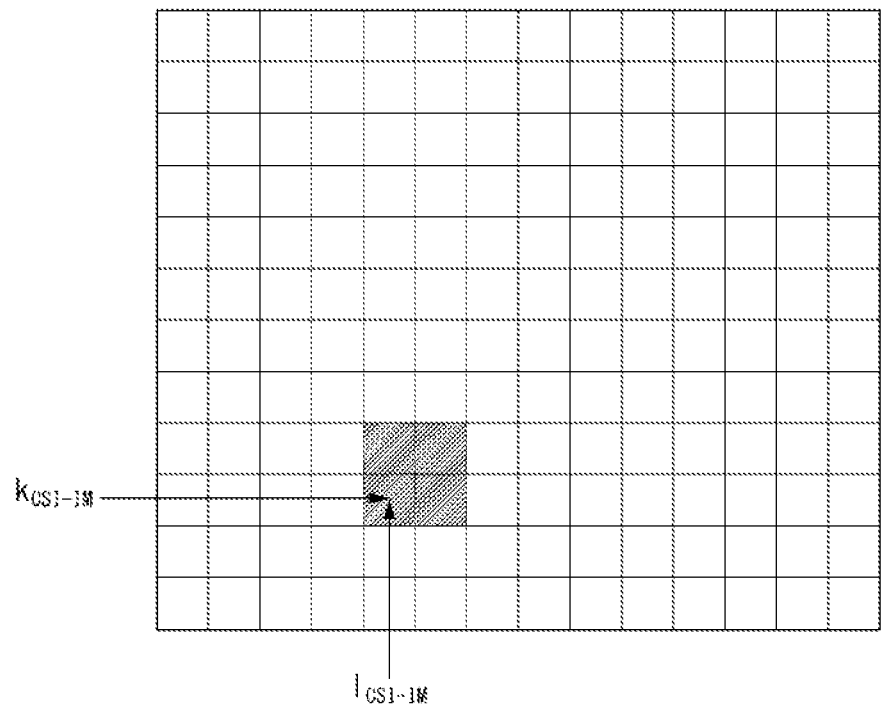
(a) Pattern 0
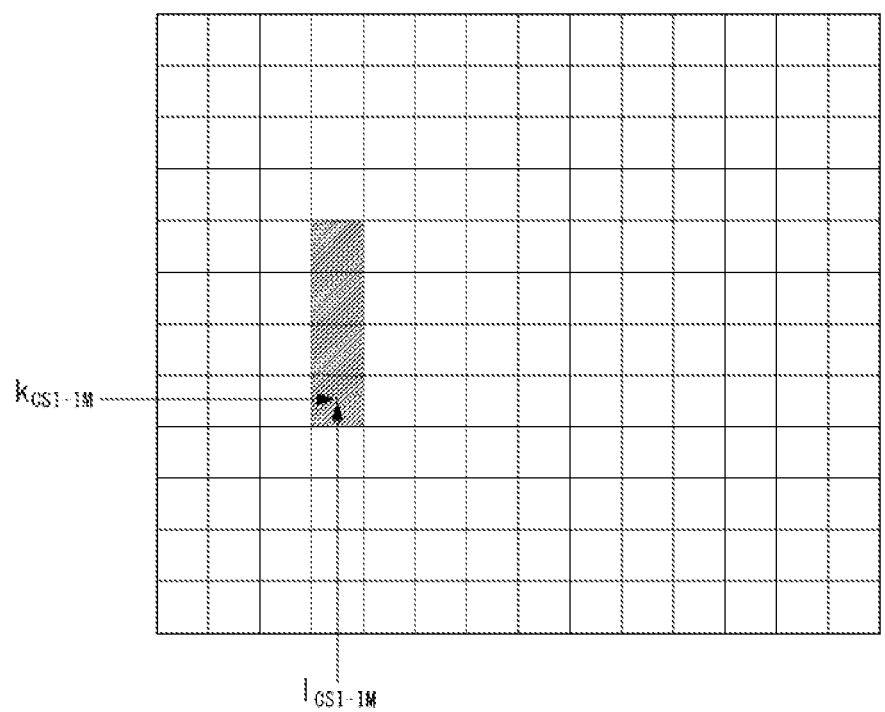
(b) Pattern 1

[FIG. 11]
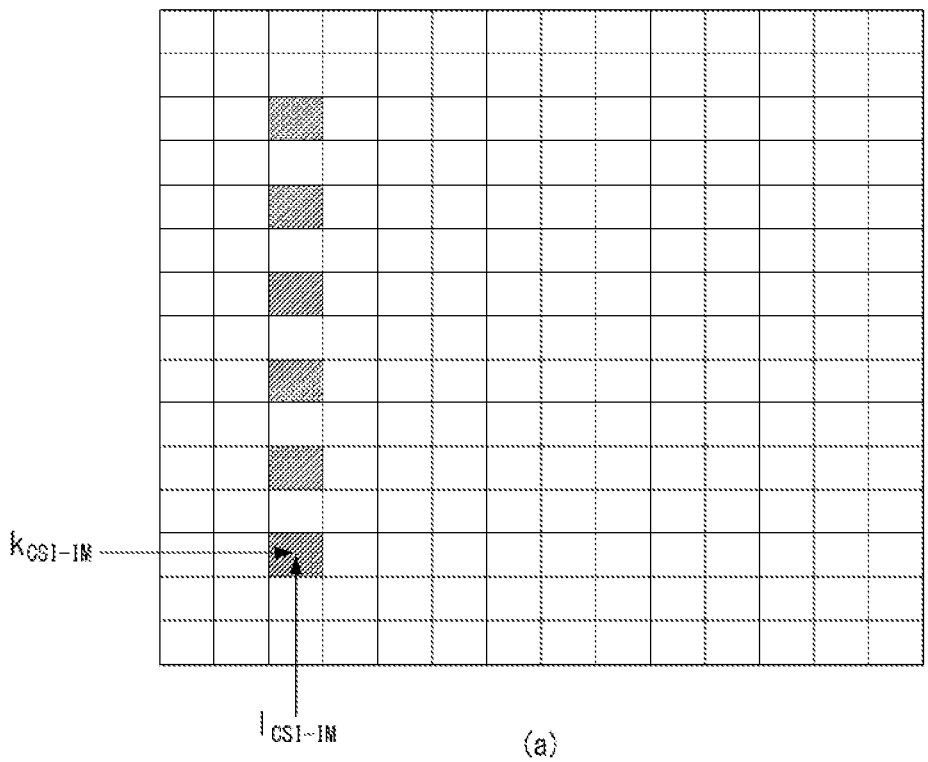
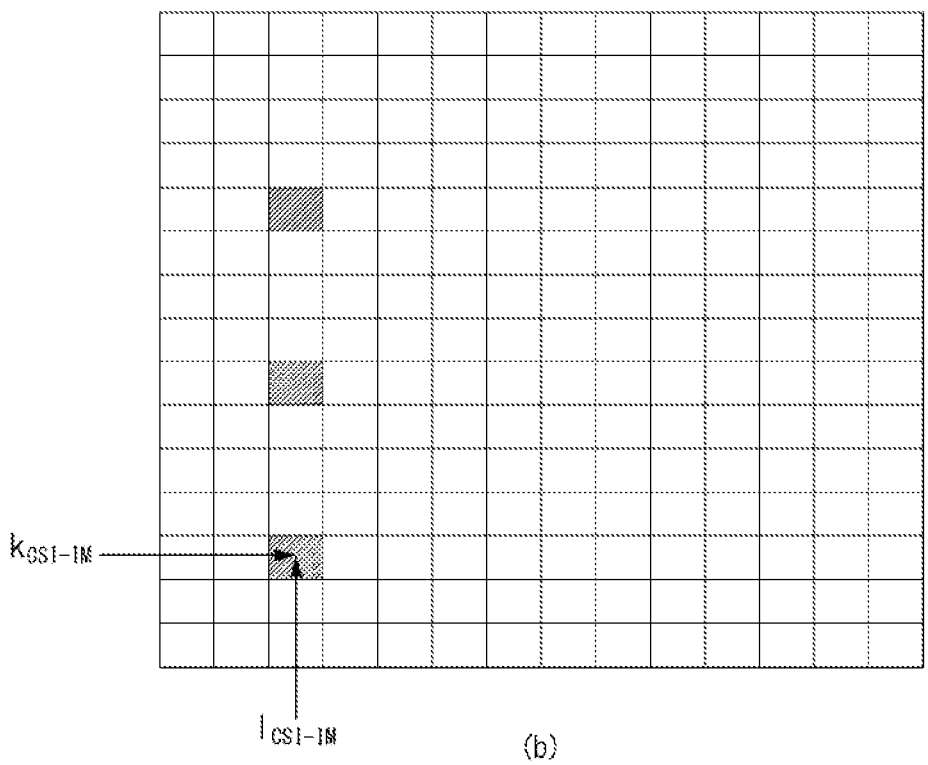

[FIG. 12]
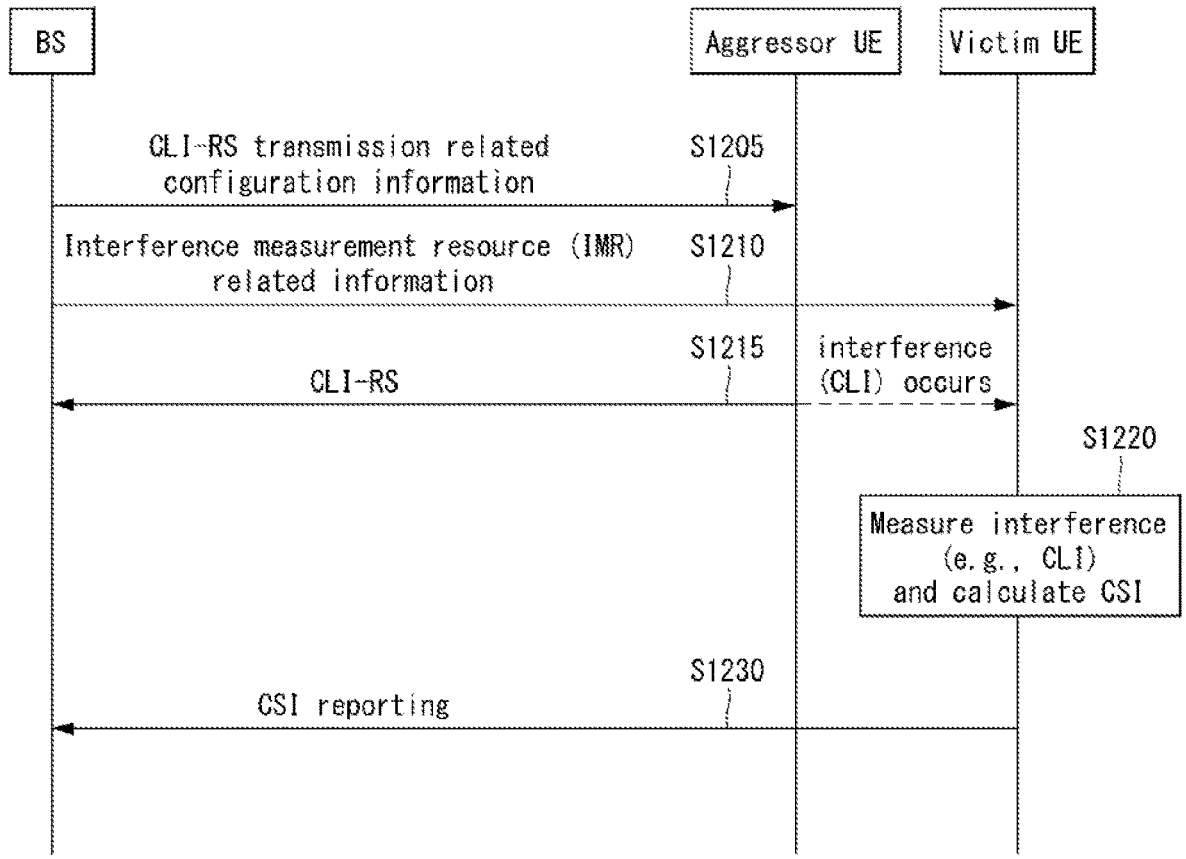
[FIG. 13]
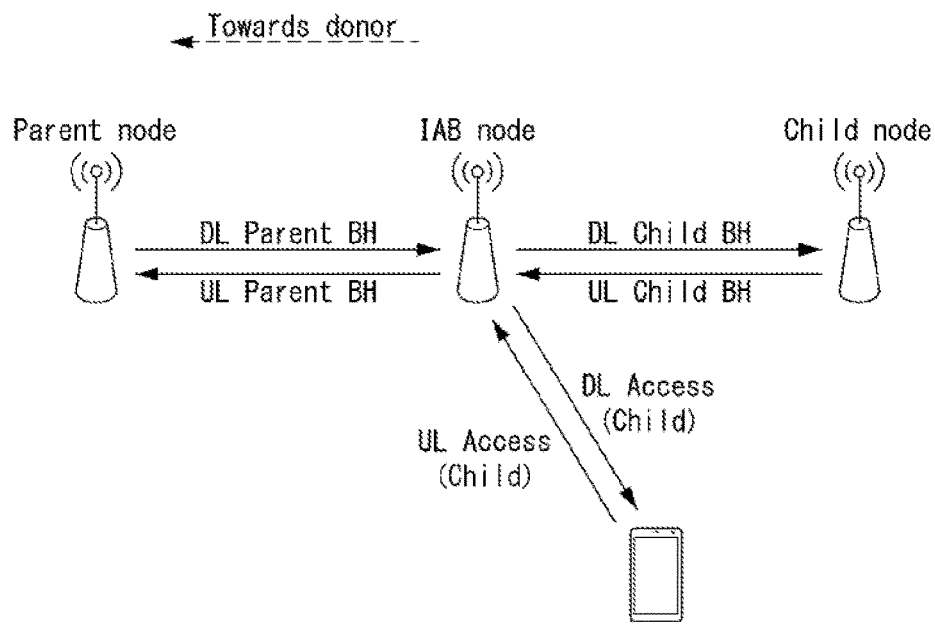

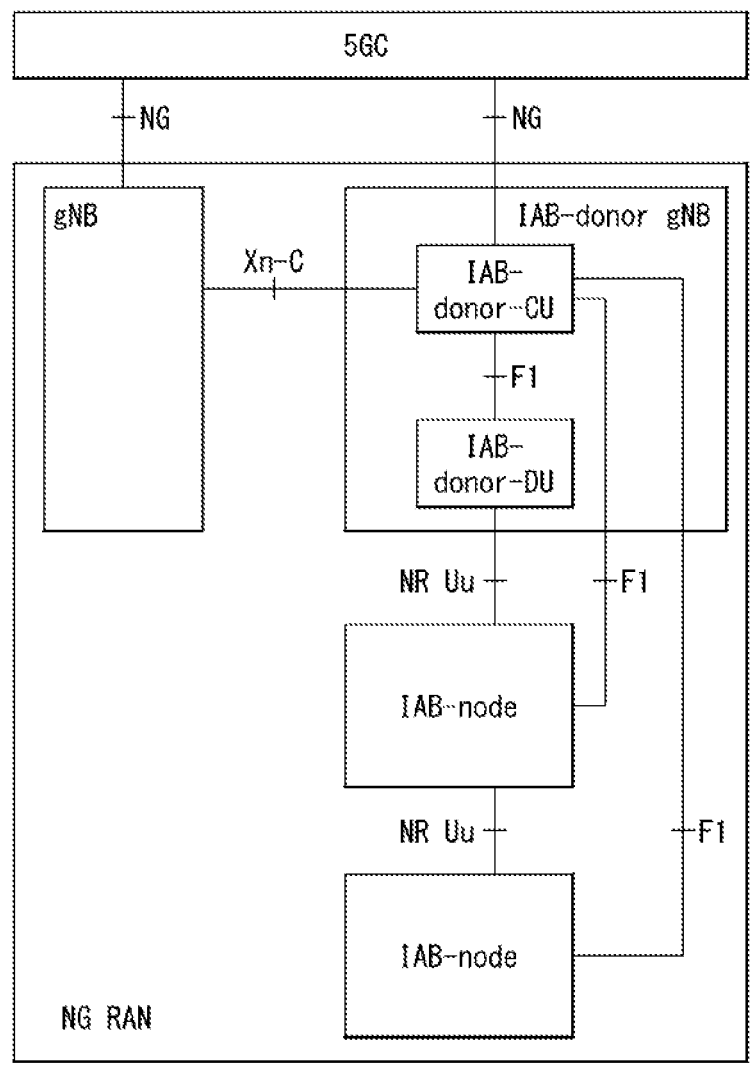
[FIG. 14]

[FIG. 15]
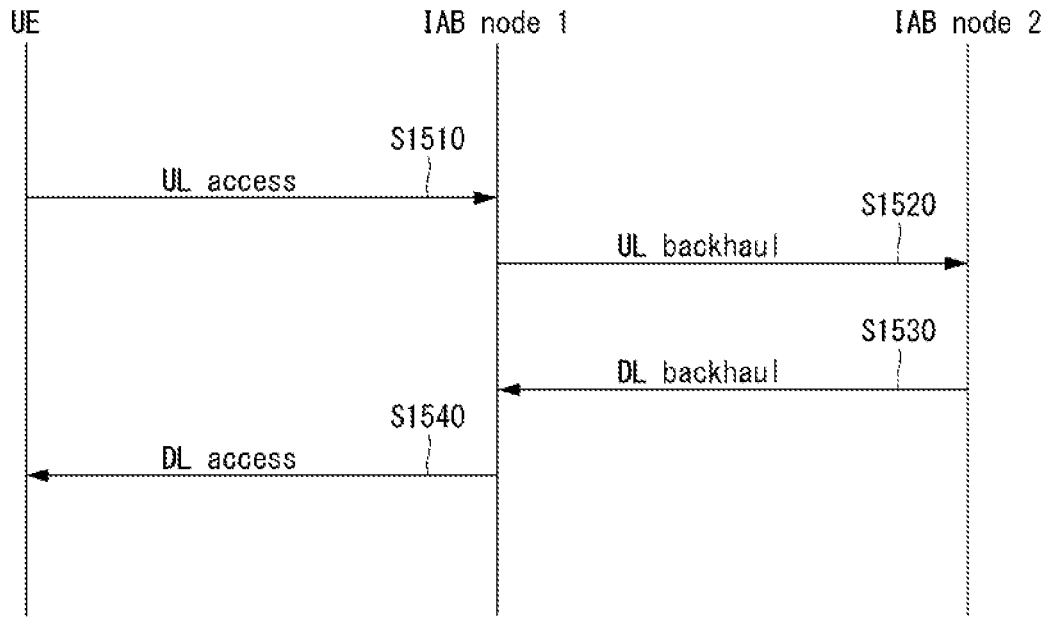
[FIG. 16]
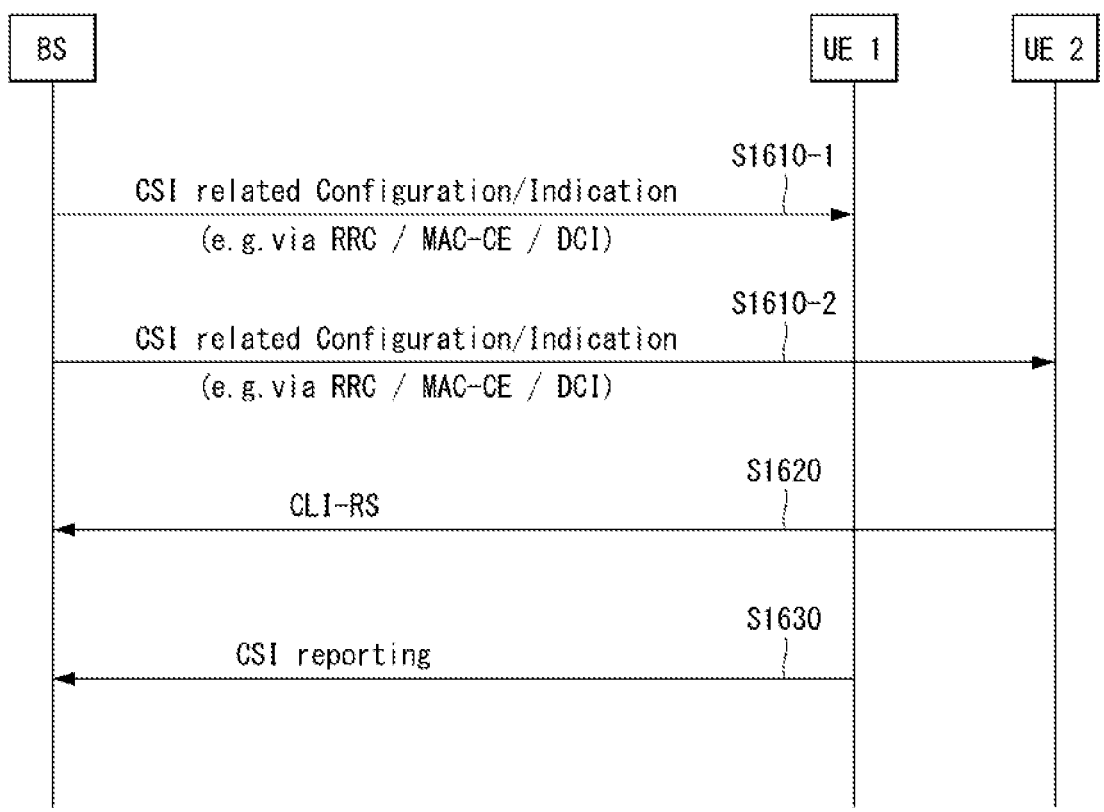

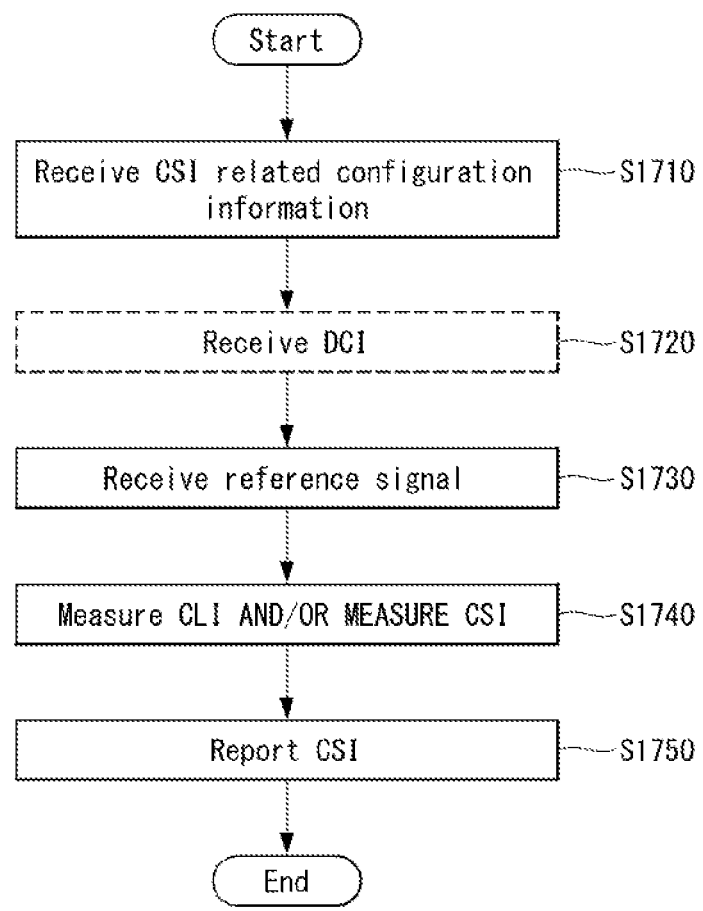
[FIG. 17]

[FIG. 18]
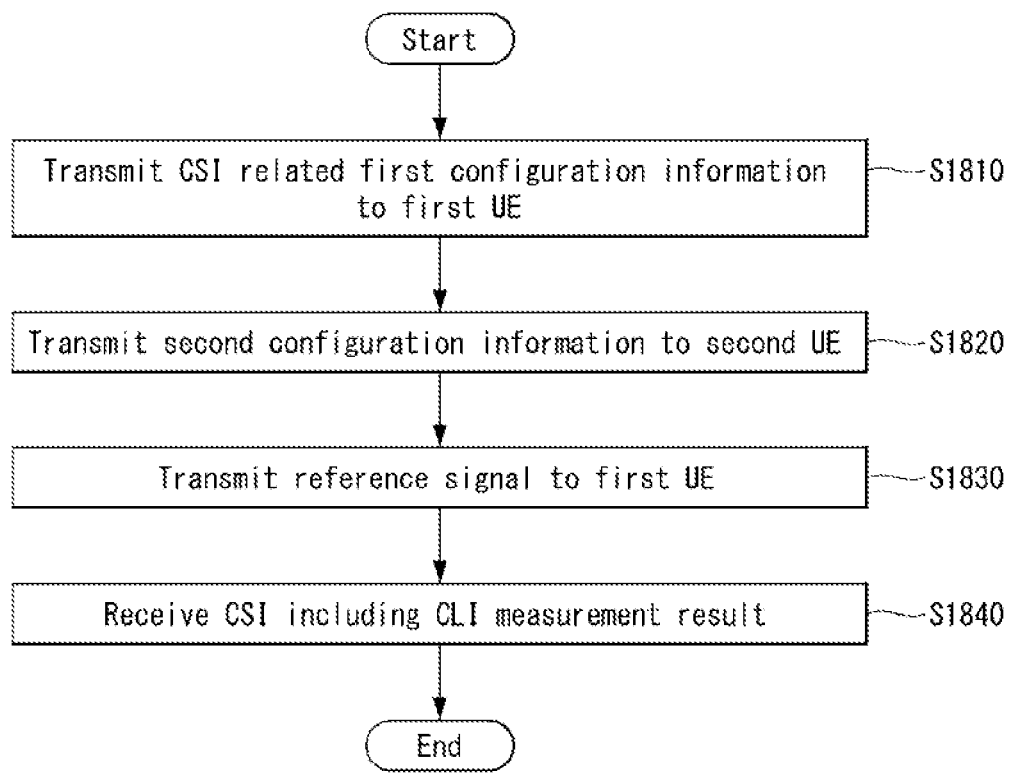

[FIG. 19]
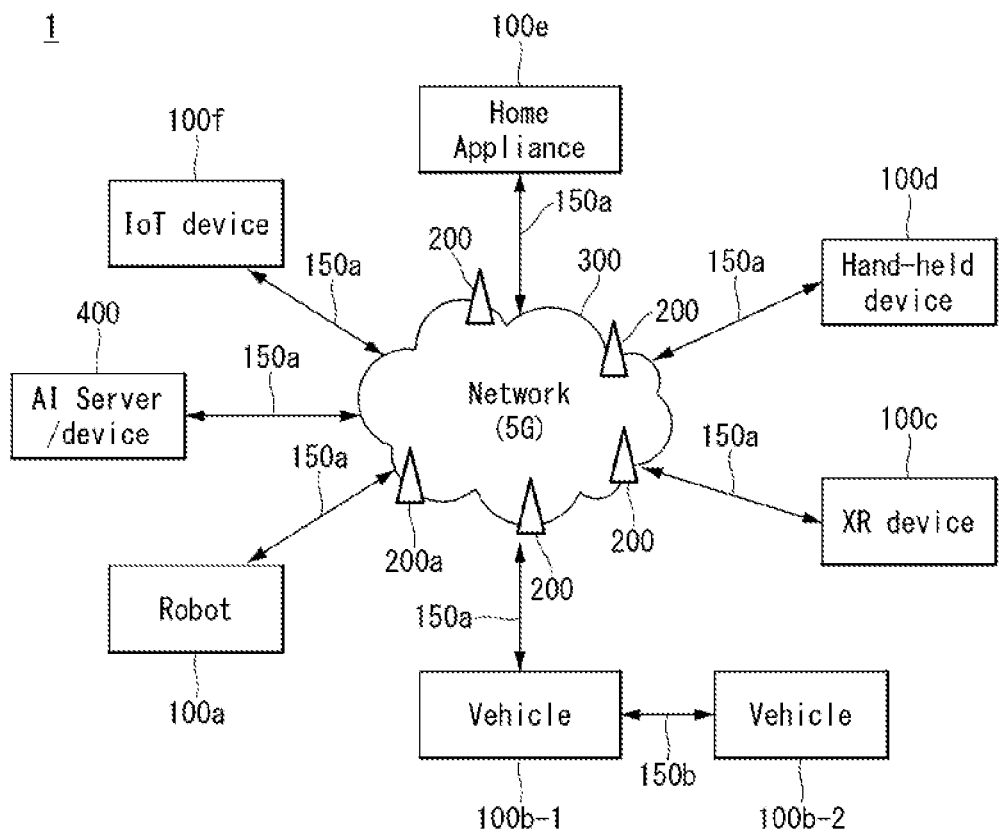
[FIG. 20]
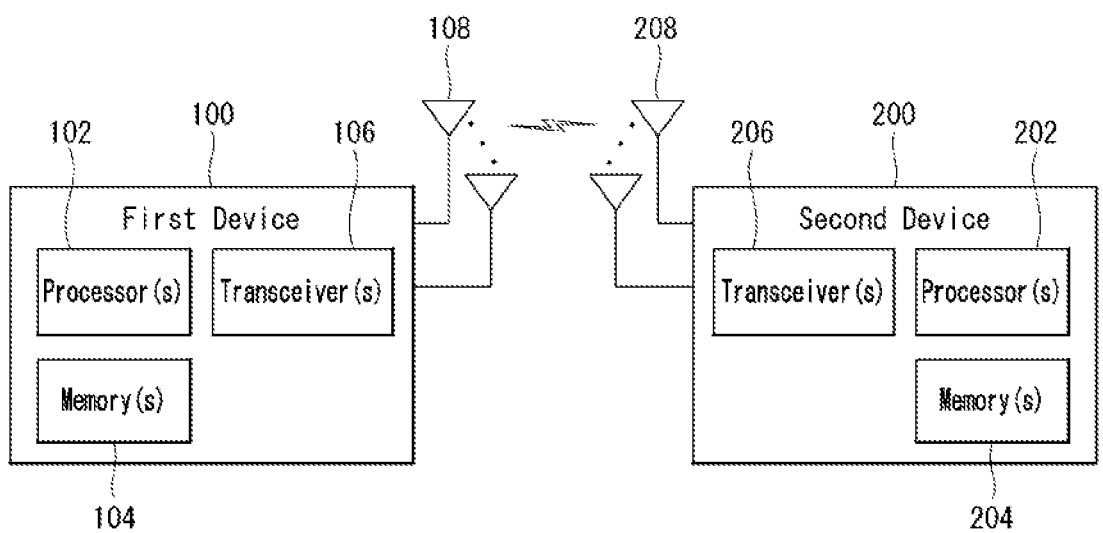

[FIG. 21]
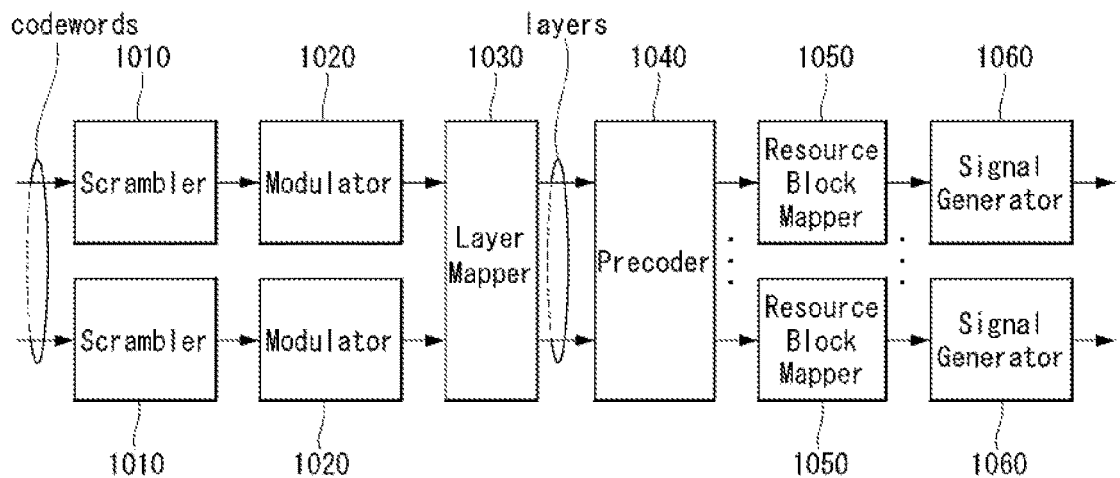
[FIG. 22]
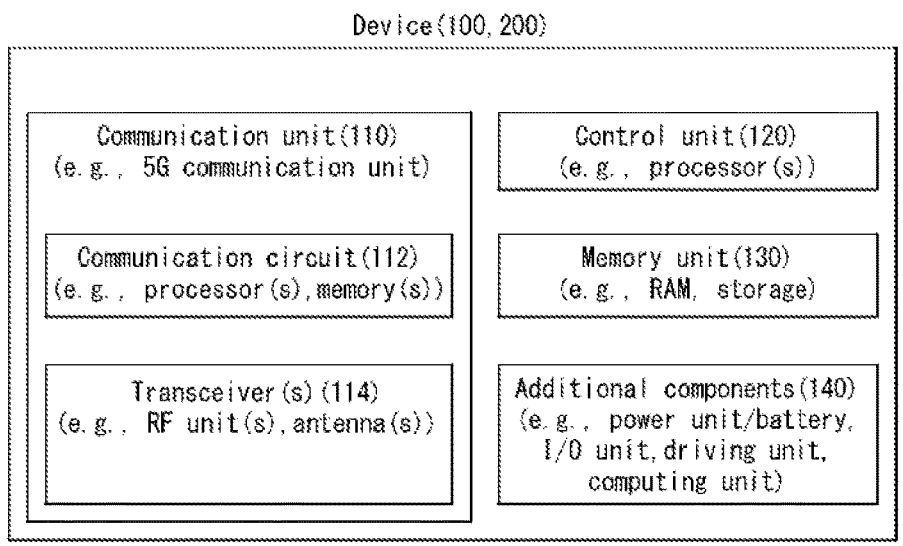

[FIG. 23]
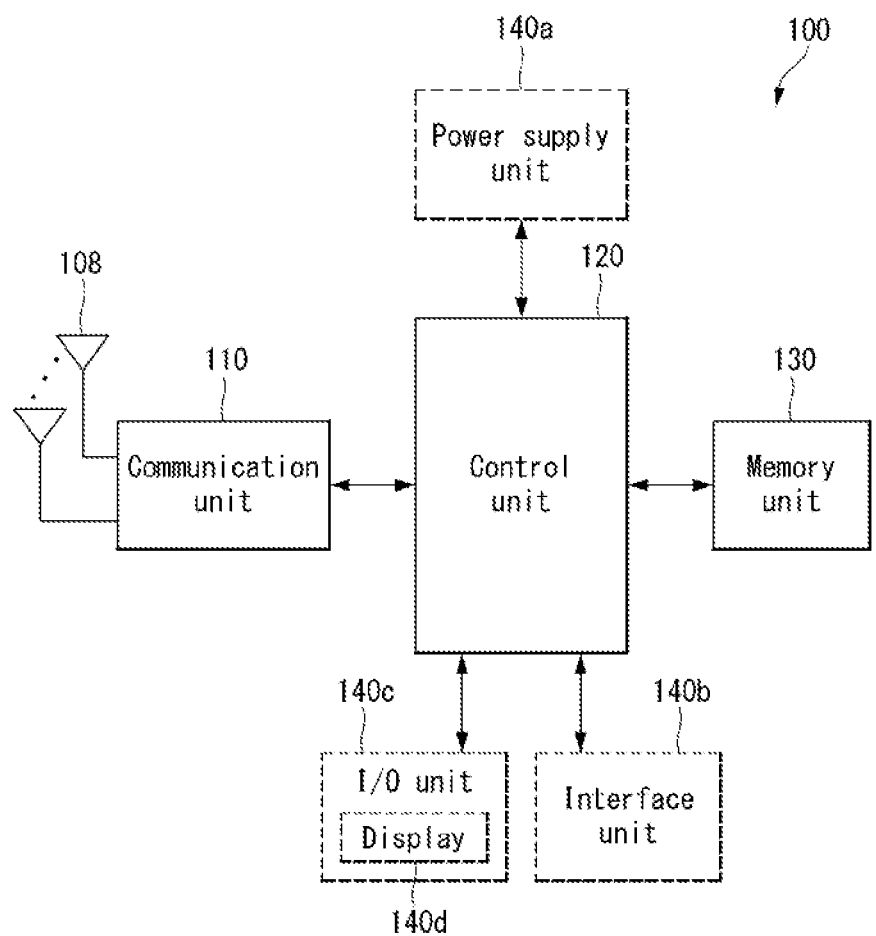

METHOD FOR REPORTING CHANNEL STATE INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/013865, filed on Oct. 12, 2020, which claims the benefit of earlier filing date and right of priority to Korean Application Nos. 10-2019-0125711 filed on Oct. 10, 2019, and 10-2019-0125712 filed on Oct. 10, 2019, the contents of which are hereby incorporated by reference herein in their entireties.

TECHNICAL FIELD

The disclosure relates to a wireless communication system and, more specifically, to a method for measuring and reporting cross-link interference and a device for supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The disclosure proposes a method for measuring cross-link interference in a wireless communication system.

Further, the disclosure proposes a method for configuring an IMR pattern for measuring cross-link interference.

Further, the disclosure proposes a method for defining a reporting parameter for reporting cross-link interference and reporting information for the measured cross-link interference.

Technical objects to be achieved by the present disclosure are not limited to the aforementioned technical objects, and other technical objects not described above may be evidently understood by a person having ordinary skill in the art to which the present disclosure pertains from the following description.

Technical Solution

According to an embodiment of the disclosure, a method for receiving channel state information (CSI) by a user equipment (UE) in a wireless communication system may comprise receiving CSI-related configuration information from a base station; receiving, from a base station, a reference signal based on the configuration information; measuring cross-link interference; and transmitting, to the base station, CSI including a report on the measured cross-link interference. The configuration information may include information related to the cross-link interference.

Further, in the method according to an embodiment of the disclosure, the configuration information may include a first configuration for a CSI resource and a second configuration for an interference measurement resource. The second configuration may include pattern information for resources for measurement of the cross-link interference.

Further, in the method according to an embodiment of the disclosure, a subcarrier start location of the resources for measurement of the cross-link interference may be determined based on the pattern information. In a frequency domain, the resources for measurement of the cross-link interference may be located in the form of comb 2 or comb 4, from the start position, in the frequency domain.

Further, in the method according to an embodiment of the disclosure, the second configuration may further include information on density of the resources for measuring the CLI, and the number of times the pattern of the resources for the measuring CLI may be repeated is determined based on the density information.

Further, in the method according to an embodiment of the disclosure, the pattern may be repeated at a specific interval in time domain, based on the density information.

Further, in the method according to an embodiment of the disclosure, the specific interval may be 1 or −1.

Further, in the method according to an embodiment of the disclosure, the method may further comprise receiving information regarding the specific interval.

Further, in the method according to an embodiment of the disclosure, the second configuration may further include information of resources for measuring background noise and interference, (i) the resources for measuring the cross-link interference and (ii) the resources for measuring the background noise and the interference may not be overlapped.

Further, in the method according to an embodiment of the disclosure, the report on the measured cross-link interference may include a reference signal received power (RSRP) or a received signal strength indicator (RSSI) for the cross-link interference.

Further, in the method according to an embodiment of the disclosure, the configuration information may further include a parameter for indicating contents of the report on the cross-link interference.

Further, in the method according to an embodiment of the disclosure, based on the parameter, the contents of report regarding at least one of a channel quality indicator, CQI related to the cross-link interference (CLI), an interference to noise ratio (INR) related to the cross-link interference, an RSRP related to the CLI and/or an indicator related to the CLI may be indicated.

Further, in the method according to an embodiment of the disclosure, the CLI may be an interference generated by uplink transmission of other UE based on the reference signal is received.

According to an embodiment of the disclosure, a user equipment (UE) reporting channel state information in a wireless communication system may comprise one or more transceiver; one or more processors; and one or more memories storing instructions for operations executed by the one or more processors and connected with the one or more processors. The operations may include receiving channel state information (CSI)-related configuration information from a base station; receiving a reference signal based on the configuration information; measuring cross-link interference; and transmitting CSI including a report on the measured cross-link interference to the base station. The configuration information may include the cross-link interference-related information.

According to an embodiment of the disclosure, a method for receiving channel state information by a base station (BS) in a wireless communication system may comprise transmitting, to a first user equipment (UE), channel state information (CSI)-related first configuration information; transmitting second configuration information to a second UE; transmitting a reference signal to the first UE; and receiving CSI including a report on cross-link interference from the first UE. The first configuration information may include information related to the cross-link interference, and the second configuration information may include a configuration for a reference signal related to cross-link interference measurement of the first UE.

According to an embodiment of the disclosure, a base station (BS) receiving channel state information in a wireless communication system may comprise one or more transceiver; one or more processors; and one or more memories storing instructions for operations executed by the one or more processors and connected with the one or more processors. The operations may include transmitting, to a first user equipment (UE), channel state information (CSI)-related first configuration information; transmitting second configuration information to a second UE; transmitting a reference signal to the first UE; and receiving CSI including a report on cross-link interference from the first UE. The first configuration information may include information related to the cross-link interference, and the second configuration information may include a configuration for a reference signal related to cross-link interference measurement of the first UE.

According to an embodiment of the disclosure, a device may comprise one or more memories and one or more processors functionally connected with the one or more memories. The one or more processors may include control the device to receive CSI-related configuration information, receive a reference signal based on the configuration information, measure cross-link interference, and transmit CSI including a report on the measured cross-link interference. The configuration information may include information related to the cross-link interference.

According to an embodiment of the disclosure, there may be provided one or more non-transitory computer-readable media storing one or more instructions. The one or more instructions executable by one or more processors may include instructions to enable a user equipment (UE) to receive CSI-related configuration information, receive a reference signal based on the configuration information, measure cross-link interference, and transmit CSI including a report on the measured cross-link interference. The configuration information may include information related to the cross-link interference.

Advantageous Effects

According to an embodiment of the disclosure, it is possible to configure an interference measurement resource for measuring cross-link interference.

Further, according to an embodiment of the disclosure, it is possible to enable more accurate estimation on the channel environment by measuring and reporting cross-link interference.

Effects of the disclosure are not limited to the foregoing, and other unmentioned effects would be apparent to one of ordinary skill in the art from the following description.

BRIEF DESCRIPTION OF THE DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission.

FIG. 7 illustrates an example self-contained structure to which a method proposed herein is applicable.

FIG. 8 is a flowchart illustrating an example CSI-related procedure.

FIG. 9 illustrates an example context in which a plurality of TRPs and a plurality of UEs operate in a wireless communication system.

FIG. 10 illustrates an example CSI-IM resource positioned/mapped to a resource element (RE) in each PRB.

FIG. 11 illustrates an example new pattern of a CSI-IM resource element proposed in the disclosure.

FIG. 12 illustrates a signaling example of a transmission/reception process between a base station, an aggressor UE, and a victim UE in a wireless communication system to which a method proposed in the disclosure is applicable.

FIG. 13 illustrates an example of IAB.

FIG. 14 illustrates an example of IAB architecture.

FIG. 15 illustrates an example of signaling of a UE and a one-hop chain IAB.

FIG. 16 illustrates an example signaling procedure between a base station and a UE to report CSI including a report for CLI to which methods proposed in the disclosure are applicable.

FIG. 17 illustrates an example of a CSI reporting operation flowchart of a user equipment (UE) to which methods proposed in the disclosure are applicable.

FIG. 18 illustrates an example of a CSI reception operation flowchart of a base station to which methods proposed in the disclosure are applicable.

FIG. 19 illustrates a communication system (1) applied to the present disclosure.

FIG. 20 illustrates a wireless device which may be applied to the present disclosure.

FIG. 21 illustrates a signal processing circuit for a transmit signal.

FIG. 22 illustrates another example of a wireless device applied to the present disclosure.

FIG. 23 illustrates a portable device applied to the present disclosure.

MODE FOR INVENTION

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increase in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected device (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication become increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in a table 1.

TABLE 1

| μ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$ DL and UL transmission is configured as a radio frame having a section of $T_f=(\Delta f_{max}N_f/100) \cdot T_s$, $=10$ ms. The radio frame is composed of ten subframes each having a section of $T_{sf}=(\Delta f_{max}N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^{\mu} N_{sc}^{RB}-1$ is an index on a frequency domain, and l̄=0 . . . , $2^{\mu} N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l̄) for the numerology P and the antenna port p corresponds to a complex value $a_{k,\bar{l}}^{(p,\mu)}$. When there is no risk for confusion or when a specific antenna port or numerology is not specified, the indices p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration coincides μ with "point A". A common resource block number $n_{CRB}^{\mu}$ can in the frequency domain and resource elements (k,l̄) for the subcarrier spacing configuration may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BPW,j}^{size}-1$, where i is No. Of the BWP. A relation between the physical resource block $n_{PRB}$ in BWP i and the common resource block $n_{CRB}$ may be given by the following Equation 2.

$$n_{CRB} \cdot n_{PRB} + N_{BWP,i}^{start} \quad \text{[Equation 2]}$$

Here, $N_{BWP,i}^{start}$ may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may consist of consecutive resource blocks (RBs) on the frequency axis and may correspond to one numerology (e.g., sub-carrier spacing, CP length, slot/mini-slot duration).

A base station may configure multiple BWPs even within one CC configured to the UE. As one example, a BWP occupying a relatively small frequency domain may be configured in a PDCCH monitoring slot, and a PDSCH indicated in PDCCH may be scheduled onto a BWP larger than this. Alternatively, when UEs are concentrated on a specific BWP, some UEs may be configured with other BWPs for load balancing. Alternatively, considering frequency domain inter-cell interference cancellation between neighboring cells, a partial spectrum of the entire bandwidth may be excluded and both BWPs may be configured even in the same slot. That is, the base station may configure at least one DL/UL BWP to the UE associated with the wideband CC and may activate at least one DL/UL BWP (by L1 signaling or MAC CE or RRC signaling) among configured DL/UL BWP(s) at a specific time, and switching may be indicated to another configured DL/UL BWP (by L1 signaling or MAC CE or RRC signaling) or a timer value may be switched to the fixed DL/UL BWP when a timer value is expired based on a timer. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 6 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 are used for scheduling of PUSCH in one cell, and DCI format 1_0 and DCI format 1_1 are used for scheduling PDSCH in one cell. Information included in DCI format 0_0 is CRC scrambled by C-RNTI or CS-RNTI or MCS-C-RNTI and transmitted. And, DCI format 0_1 is used for reserving PUSCH in one cell. Information included in DCI format 0_1 may be CRC scrambled by C-RNTI or CS-RNTI or SP-CSI-RNTI or MCS-C-RNTI and transmitted. DCI format 1_0 is used for scheduling PDSCH in one DL cell. Information included in DCI format 1_0 is CRC scrambled by C-RNTI or CS-RNTI or MCS-C-RNTI and transmitted. DCI format 1_1 is used for scheduling PDSCH in one cell. Information included in DCI format 1_1 is CRC scrambled by C-RNTI or CS-RNTI or MCS-C-RNTI and transmitted. DCI format 2_1 is used to inform PRB(s) and OFDM symbol(s) that the UE may assume that transmission is not intended. The following information included in DCI format 2_1 such as preemption indication 1, preemption indication 2, . . . , preemption indication N is CRC scrambled by INT-RNTI and transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

FIG. 7 illustrates one example of a self-contained structure to which the method proposed in this specification may be applied. FIG. 7 is just for convenience of the description and does not limit the scope of the present disclosure.

Referring to FIG. 7, it is assumed that one transmission unit (e.g., slot or subframe) is constituted by 14 orthogonal frequency division multiplexing (OFDM) symbols as in legacy LTE.

In FIG. 7, a region 702 refers to a downlink control region and a region 704 refers to an uplink control region. Further, a region (that is, a region without a separate indication) other than the regions 702 and 704 may be used for transmitting downlink data or uplink data.

That is, uplink control information and downlink control information may be transmitted in one self-contained slot. On the contrary, in the case of data, the uplink data or downlink data may be transmitted in one self-contained slot.

The PDCCH may be transmitted in the DL control region, and the PDSCH may be transmitted in the DL data region. The PUCCH may be transmitted in the UL control region, and the PUSCH may be transmitted in the UL data region. In the PDCCH, downlink control information (DCI), for example, DL data scheduling information, UL data scheduling information, etc. may be transmitted. In the PUCCH, Uplink Control Information (UCI), for example, ACK/NACK (Positive Acknowledgment/Negative Acknowledgment) information for DL data, CSI (Channel State Information) information, SR (Scheduling Request), etc. may be transmitted.

In the self-contained slot structure illustrated in FIG. 7, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Channel State Information (CSI)-Related Procedure

In the new radio (NR) system, a channel state information-reference signal (CSI-RS) is used for time/frequency tracking, CSI computation, layer 1(L1)-reference signal received power (RSRP) computation, or mobility. The CSI computation is related to CSI acquisition, and L1-RSRP computation is related to beam management (BM).

Hereinafter, operation of a UE with respect to the CSI-related procedure will be described.

FIG. 8 is a flowchart illustrating an example of a CSI-related procedure.

Referring to FIG. 8, to perform one of the above purposes of a CSI-RS, a terminal (e.g., a UE) receives CSI related configuration information from a base station (e.g., a general node B (gNB)) through a radio resource control (RRC) signaling (S810).

The CSI-related configuration information may include at least one of CSI interference management (IM) resource-related information, CSI measurement configuration-related information, CSI resource configuration-related information, CSI-RS resource-related information, or CSI reporting configuration-related information.

The CSI-IM resource-related information may include CSI-IM resource information, CSI-IM resource set information, etc. The CSI-IM resource set is identified by a CSI-IM resource set ID (identifier), and one resource set includes at least one CSI-IM resource. Each CSI-IM resource is identified by a CSI-IM resource ID.

The CSI resource configuration-related information defines a group including at least one of a non-zero power (NZP) CSI-RS resource set, a CSI-IM resource set, or a CSI-SSB resource set. That is, the CSI resource configuration-related information includes a CSI-RS resource set list, and the CSI-RS resource set list may include at least one of a NZP CSI-RS resource set list, a CSI-IM resource set list, or a CSI-SSB resource set list. The CSI resource configuration-related information may be expressed as CSI-REsourceConfig IE. The CSI-RS resource set is identified by a CSI-RS resource set ID, and one resource set includes at least one CSI-RS resource. Each CSI-RS resource is identified by a CSI-RS resource ID.

Table 5 shows an example of NZP CSI-RS resource set IE. As shown in Table 5, parameters (e.g.: the BM-related parameter repetition, and the tracking-related parameter trs-Info indicative of (or indicating) a purpose of a CSI-RS may be set for each NZP CSI-RS resource set.

TABLE 5

-- ASN1START
-- TAG-NZP-CSI-RS-RESOURCESET-START
NZP-CSI-RS-ResourceSet ::=          SEQUENCE {
    nzp-CSI-ResourceSetId           NZP-CSI-RS-ResourceSetId,
    nzp-CSI-RS-Resources            SEQUENCE (SIZE
                                    (1..maxNrofNZP-CSI-RS-
ResourcesPerSet)) OF NZP-CSI-RS-ResourceId,
    repetition                      ENUMERATED { on, off }
    aperiodicTriggeringOffset       INTEGER (0..4)
    trs-Info                        ENUMERATED {true}
    ...
}
-- TAG-NZP-CSI-RS-RESOURCESET-STOP
-- ASN1STOP In addition, the parameter repetition corresponding to a higher layer parameter corresponds to "CSI-RS-ResourceRep" of L1 parameter.

The CSI reporting configuration related information includes the parameter reportConfigType indicative of a time domain behavior and the parameter reportQuantity indicative of a CSI-related quantity to be reported. The time domain behavior may be periodic, aperiodic, or semi-persistent.

The CSI reporting configuration-related information may be represented as CSI-ReportConfig IE, and Table 5 shows an example of the CSI-ReportConfig IE.

TABLE 6

-- ASN1START
-- TAG-CSI-RESOURCECONFIG-START
CSI-ReportConfig : :=               SEQUENCE {
    reportConfigId                  CSI-ReportConfigId,
    carrier                         ServCellIndex           OPTIONAL, -
- Need S
    resourcesForChannelMeasurement  CSI-ResourceConfigId,
    csi-IM-ResourcesForInterference CSI-ResourceConfigId    OPTIONAL, -
- Need R
    nzp-CSI-RS-ResourcesForInterference CSI-ResourceConfigId OPTIONAL, -
- Need R
    reportConfigType                CHOICE {
        periodic                        SEQUENCE {
            reportSlotConfig                CSI-
ReportPeriodicityAndOffset,
            pucch-CSI-ResourceList          SEQUENCE (SIZE
(1..maxNrofBWPs)) OF PUCCH-CSI-Resource
        },
        semiPersistentOnPUCCH           SEQUENCE {
            reportSlotConfig                CSI -
ReportPeriodicityAndOffset,
            pucch-CSI-ResourceList          SEQUENCE (SIZE
(1..maxNrofBWPs)) OF PUCCH-CSI-Resource TABLE 6-continued

```
    },
    semiPersistentOnPUSCH          SEQUENCE {
        reportSlotConfig               ENUMERATED {sl5, sl10, sl20,
sl40, sl80, sl160, sl320},
        reportSlotOffsetList           SEQUENCE (SIZE (1.. maxNrofUL-
Allocations)) OF INTEGER (0..32),
        p0alpha                        P0-PUSCH-AlphaSetId
    },
    aperiodic                      SEQUENCE {
        reportSlotOffsetList           SEQUENCE (SIZE (1..maxNrofUL-
Allocations)) OF INTEGER (0 .. 32)
    }
},
reportQuantity                     CHOICE {
    none                               NULL,
    cri-RI-PMI-CQI                     NULL,
    cri-RI-i1                          NULL,
    cri-RI-i1-CQI                      SEQUENCE {
        pdsch-BundleSizeForCSI             ENUMERATED {n2, n4}
OPTIONAL
    },
    cri-RI-CQI                         NULL,
    cri-RSRP                           NULL,
    ssb-Index-RSRP                     NULL,
    cri-RI-LI-PMI-CQI                  NULL
},
```

In addition, the UE measures CSI based on configuration information related to the CSI (S820). Measuring the CSI may include (1) receiving a CSI-RS by the UE (S821) and (2) computing CSI based on the received CSI-RS (S822), a detailed description thereof described later.

resource element (RE) mapping of CSI-RS resources of the CSI-RS is performed in time and frequency domains by higher layer parameter CSI-RS-ResourceMapping.

Table 7 shows an example of CSI-RS-ResourceMapping IE.

Herein, when a quantity of CSI-ReportConfig in Table 7 is set to "none (or No report)", the UE may skip the reporting.

However, even when the quantity is set to "none (or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

TABLE 7

```
-- ASN1START
-- TAG-CSI-RS-RESOURCEMAPPING-START
CSI-RS-ResourceMapping ::=    SEQUENCE {
    frequencyDomainAllocation     CHOICE
        row1                          BIT STRING (SIZE (4)],
        row2                          BIT STRING (SIZE (12)],
        row4                          BIT STRING (SIZE (3)],
        other                         BIT STRING (SIZE (6)]
    },
    nrofPorts                     ENUMERATED {p1,p2,p4,p8,p12,p16,p24,p32},
    firstOFDMSymbolInTimeDomain   INTEGER (0..13),
    firstOFDMSymbolInTimeDomain2  INTEGER (2..12)
    cdm-Type                      ENUMERATED (noCDM, fd-CDM2, cdm4-FD2-TD2, cdm8-
FD2-TD4},
    density                       CHOICE {
        dot5                          ENUMERATED {evenPRBs, oddPRBs},
        one                           NULL,
        three                         NULL,
        spare                         NULL
    },
    freqBand                      CSI-FrequencyOccupation,
    ...
}
```

In Table 7, a density (D) indicates a density of CSI-RS resources measured in a RE/port/physical resource block (PRB), and nrofPorts indicates the number of antenna ports.

The UE reports the measured CSI to the base station (S730).

CSI Measurement

The NR system supports more flexible and dynamic CSI measurement and reporting. The CSI measurement may include receiving a CSI-RS, and acquiring CSI by computing the received CSI-RS.

As time domain behaviors of CSI measurement and reporting, aperiodic/semi-persistent/periodic channel measurement (CM) and interference measurement (IM) are supported. To configure CSI-IM, four port NZP CSI-RS RE patterns are used.

CSI-IM-based IMR of NR has a design similar to CSI-IM of LTE and is configured independent of ZP CSI-RS resources for PDSCH rate matching. In addition, each port in the NZP CSI-RS-based IMR emulates an interference layer having (a desirable channel and) a pre-coded NZP CSI-RS. This is about intra-cell interference measurement of a multi-user case, and it primarily targets MU interference.

At each port of the configured NZP CSI-RS-based IMR, the base station transmits the pre-coded NZP CSI-RS to the UE.

The UE assumes a channel/interference layer for each port in a resource set, and measures interference.

If there is no PMI or RI feedback for a channel, a plurality of resources are configured in a set and the base station or network indicates, through DCI, a subset of NZP CSI-RS resources for channel/interference measurement.

Resource setting and resource setting configuration will be described in more detail.

Resource Setting

Each CSI resource setting "CSI-ResourceConfig" includes configuration of S≥1 CSI resource set (which is given by higher layer parameter "csi-RS-ResourceSetList"). Herein, a CSI resource setting corresponds to CSI-RS-resourcesetlist. Herein, S represents the number of configured CSI-RS resource sets. Herein, configuration of S≥1 CSI resource set includes each CSI resource set including CSI-RS resources (composed of NZP CSI-RS or CSI-IM), and a SS/PBCH block (SSB) resource used for L1-RSRP computation.

Each CSI resource setting is positioned at a DL bandwidth part (BWP) identified by higher layer parameter bwp-id. In addition, all CSI resource settings linked to a CSI reporting setting have the same DL BWP.

In a CSI resource setting included in CSI-ResourceConfig IE, a time domain behavior of a CSI-RS resource may be indicated by higher layer parameter resourceType and may be configured to be aperiodic, periodic, or semi-persistent. The number S of CSI-RS resource sets configured for periodic and semi-persistent CSI resource settings is restricted to "1". A periodicity and a slot offset configured for periodic and semi-persistent CSI resource settings are given from a numerology of related DL BWP, just like being given by bwp-id.

When the UE is configured with a plurality of CSI-ResourceConfig including the same NZP CSI-RS resource ID, the same time domain behavior is configured for the CSI-ResourceConFIG.

When the UE is configured with a plurality of CSI-ResourceConfig having the same CSI-IM resource ID, the same time domain behavior is configured for the CSI-ResourceConFIG.

Then, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, CMR (channel measurement resource) may be the NZP CSI-RS for CSI acquisition, and IMR (Interference measurement resource) may be NZP CSI-RS for CSI-IM and IM.

Here, CSI-IM (or ZP CSI-RS for IMS) is used mainly for inter-cell interference measurement.

The NZP CSI-RS for IM is used mainly for intra-cell interference measurement from multiple users.

The UE may assume that a CSI-RS resource(s) and a CSI-IM/NZP CSI-RS resource(s) for interference measurement configured for one CSI reporting is "QCL-TypeD" for each resource.

Resource Setting Configuration

As described above, a resource setting may represent a resource set list.

Regarding aperiodic CSI, each trigger state configured using higher layer parameter "CSI-AperiodicTriggerState" is that each CSI-ReportConfig is associated with one or multiple CSI-ReportConfig linked to a periodic, semi-persistent, or aperiodic resource setting.

One reporting setting may be connected to three resource settings at maximum.

When one resource setting is configured, a resource setting (given by higher layer parameter resourcesForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForInterference or nzp-CSI-RS-ResourcesForInterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

Regarding semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, the first resource setting (given by resourcesForChannelMeasurement) is for channel measurement, and the second resource setting (given by the higher layer parameter "csi-IM-ResourcesForInterference") is used for interference measurement performed on CSI-IM.

CSI Computation

If interference measurement is performed on CSI-IM, each CSI-RS resource for channel measurement is associated with a CSI-RS resource in a corresponding resource set by an order of CSI-RS resources and CSI-IM resources.

When interference measurement is performed in NZP CSI-RS, the UE does not expect that more than 1 NZP CSI-RS resource is configured in the resource set associated with the resource setting for channel measurement.

A UE configured with the higher layer parameter 'nzp-CSI-RS-ResourcesForInterference' may expect 18 or less NZP CSI-RS ports in the NZP CSI-RS resource set.

For CSI measurement, the UE assumes the following.

Each NZP CSI-RS port configured for interference measurement corresponds to an interference transport layer.

All interference transport layers of the NZP CSI-RS port for interference measurement consider the EPRE (energy per resource element) ratio.

NZP CSI-RS resource for channel measurement, NZP CSI-RS resource for interference measurement or other interference signals on RE(s) of CSI-IM resource for interference measurement CSI Reporting For CSI reporting, time and frequency resources available for a UE are controlled by a base station.

CSI may include at least one of channel quality indicator (CQI), a precoding matrix indicator (PMI), a CSI-RS resource indicator (CRI), am SS/PBCH block resource indicator (SSBRI), a layer indicator (LI), a rank indicator (RI), or L1-RSRP.

Regarding the CQI, the PMI, the CRI, the SSBRI, the LI, the RI, and the L1-RSRP, the UE may be configured with N≥1 CSI-ReportConfig reporting setting, M≥1 CSI-ResourceConfig resource setting, and a list of one or two trigger states (provided by aperiodicTriggerStateList and semiPersistentOnPUSCH-TriggerStateList) by a higher layer. In the aperiodicTriggerStateList, each trigger state includes a channel and a list of associated CSI-ReportConfigs selectively indicative of Resource set IDs for interference. In the semiPersistentOnPUSCH-TriggerStateList, each trigger state includes one associated CSI-ReportConFIG.

In addition, a time domain behavior of CSI reporting supports periodic, semi-persistent, and aperiodic CSI reporting.

i) The periodic CSI presorting is performed on a short PUCCH and a long PUCCH. A periodicity and a slot offset of the periodic CSI reporting may be configured by RRC and refer to CSI-ReportConfig IE.

ii) SP CSI reporting is performed on a short PUCCH, a long PUCCH, or a PUSCH.

In the case of SP CSI on a short/long PUCCH, a periodicity and a slot offset are configured by RRC, and CSI reporting to an additional MAC CE is activated/deactivated In the case of SP CSI on a PUSCH, a periodicity of SP CSI reporting is configured by RRC, but a slot offset thereof is not configured by RRC and SP CSI reporting is activated/deactivated by DCI (format 0_1).

The first CSI reporting timing follows a PUSCH time domain allocation value indicated by DCI, and subsequent CSI reporting timing follows a periodicity which is configured by RRC. For SP CSI reporting on a PUSCH, a separated RNTI (SP-CSI C-RNTI) is used.

DCI format 0_1 may include a CSI request field and activate/deactivate a specific configured SP-CSI trigger state. In addition, SP CSI reporting is activated/deactivated identically or similarly to a mechanism having data transmission on a SPS PUSCH.

iii) aperiodic CSI reporting is performed on a PUSCH and triggered by DCI. In this case, information related to the trigger of aperiodic CSI reporting may be transferred/indicated/configured through MAC-CE.

In the case of AP CSI having an AP CSI-RS, an AP CSI-RS timing is configured by RRC. Herein, a timing of AP CSI reporting is dynamically controlled by DCI.

A reporting method (e.g., transmitting in order of RI, WB, PMI/CQI, and SB PMI/CQI) by which CSI is divided and reported in a plurality of reporting instances, the method which is applied for PUCCH-based CSI reporting in LTE, is not applied in NR. Instead, NR restricts configuring specific CSI reporting on a short/long PUCCH, and a CSI omission rule is defined. Regarding an AP CSI reporting timing, PUSCH symbol/slot location is dynamically indicated by DCI. In addition, candidate slot offsets are configured by RRC. Regarding CSI reporting, a slot offset(Y) is configured for each reporting setting. Regarding UL-SCH, a slot offset K2 is configured separately.

Two CSI latency classes (low latency class and high latency class) are defined in terms of CSI computation complexity. The low latency CSI is WB CSI that includes up to 4-ports Type-I codebook or up to 4-ports non-PMI feedback CSI. The high latency CSI is a CSI other than the low latency CSI. Regarding a normal UE, (Z, Z') is defined in a unit of OFDM symbols. Z represents the minimum CSI processing time after receiving CSI triggering DCI and before performing CSI reporting. Z' represents the minimum CSI processing time after receiving CSI-RS about a channel/interference and before performing CSI reporting.

Additionally, the UE reports the number of CSI which can be calculated at the same time.

Table 8 below is related to the CSI reporting configuration defined in TS38.214.

TABLE 8

5.2.1.4 Reporting configurations
The US shall calculate CSI parameters (if reported) assuming the following dependencies between CSI parameters (if reported)
LI shall be calculated conditioned on the reported CQI, PMI, RI and CRI
CQI shall be calculated conditioned on the reported PMI, RI and CRI
PMI shall be calculated conditioned on the reported RI and CRI
RI shall be calculated conditioned on the reported CRI.
The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Subclause 5.2.1.5.2. Aperiodic CSI-RS is configured and triggered/activated as described in Subclause 5.2.1.5.1.
Table 5.2.1.4-1: Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE | Triggered by DCI; additionally, |

TABLE 8-continued 5.2.1.4 Reporting configurations
The US shall calculate CSI parameters (if reported) assuming the following
dependencies between CSI parameters (if reported)
LI shall be calculated conditioned on the reported CQI, PMI, RI and CRI
CQI shall be calculated conditioned on the reported PMI, RI and CRI
PMI shall be calculated conditioned on the reported RI and CRI
RI shall be calculated conditioned on the reported CRI.
The Reporting configuration for CSI can be aperiodic (using PUSCH), periodic (using
PUCCH) or semi-persistent (using PUCCH, and DCI activated PUSCH). The CSI-RS
Resources can be periodic, semi-persistent, or aperiodic. Table 5.2.1.4-1
shows the supported combinations of CSI Reporting configurations and CSI-RS
Resource configurations and how the CSI Reporting is triggered for each
CSI-RS Resource configuration. Periodic CSI-RS is configured by higher
layers. Semi-persistent CSI-RS is activated and deactivated as described
in Subclause 5.2.1.5.2. Aperiodic CSI-RS is configured and
triggered/activated as described in Subclause 5.2.1.5.1.
Table 5.2.1.4-1: Triggering/Activation of CSI Reporting for the possible
CSI-RS Configurations.

| CSI-RS Configuration | Periodic CSI Reporting | Semi-Persistent CSI Reporting | Aperiodic CSI Reporting |
|---|---|---|---|
| Semi-Persistent CSI-RS | Not Supported | receives an activation command [10, TS 38.321]; for reporting on PUSCH, the UE receives triggering on DCI For reporting on PUCCH, the UE receives an activation Command [10, TS 38.321]; for reporting on PUSCH, the UE receives triggering on DCI | activation command [10, TS 38.321] possible as defined in Subclause 5.2.1.5.1. Triggered by DCI; additionally, activation command [10, TS 38.321] possible defined in Subclause 5.2.1.5.1. |
| Aperiodic CSI-RS | Not Supported | Not Supported | Triggered by DCI; additionally, activation command [10, TS 38.321] possible defined in Subclause 5.2.1.5.1. |

Further, Table 9 below is information related to activation/deactivation/trigger by MAC-CE related to Semi-Persistent/Aperiodic CSI reporting defined in TS38.321.

TABLE 9

5.18.2 Activation/Deactivation of Semi-persistent CSI-RS/CSI-IM resource set
The network may activate and deactivate the configured Semi-persistent CSI-RS/CSI-IM
resource sets of a Serving Cell by sending the SP CSI-RS/CSI-IM Resource Set
Activation/Deactivation MAC CE described in subclause 6.1.3.12. The configured Semi-persistent
CSI-RS/CSI-IM resource sets are initially deactivated upon configuration and after a handover.
The MAC entity shall:
    1> if the MAC entity receives an SP CSI-RS/CSI-IM Resource Set
       Activation/Deactivation MAC CE on a Serving Cell:
    2> indicate to lower layers the information regarding the SP CSI-RS/CSI-IM Resource Set
Activation/Deactivation MAC CE.
5.18.3 Aperiodic CSI Trigger State subselection
The network may select among the configured aperiodic CSI trigger states of a Serving
Cell by sending the Aperiodic CSI Trigger State Subselection MAC CE described in subclause
6.1.3.13.
The MAC entity shall:
    1> if the MAC entity receives an Aperiodic CSI trigger State
       Subselection MAC CE on a Serving Cell:
    2> indicate to lower layers the information regarding Aperiodic CSI trigger State
Subselection MAC CE.

The foregoing description (e.g., 3GPP system, frame structure, CSI-related operation) may be applied in combination with the methods proposed in the disclosure or may be added up to clarify the technical characteristics of the methods proposed in the disclosure. Further, in the disclosure, 'A/B' may mean including both or either A and/or B.

With the expansion of massive MIMO, multi-beam systems, and multi-TRP operations in NR systems, wireless communication systems are becoming more complex, and environments in which interference between channels, links and/or components exists are also increasing.

FIG. 9 illustrates an example context in which a plurality of TRPs and a plurality of UEs operate in a wireless communication system. Referring to FIG. 9, UE1 receives a downlink (hereinafter, DL) from TRP1. UE2 transmits an uplink (hereinafter, UL) to TRP2. In other words, TRP1 supports the DL of UE1, and TRP2 supports the UL of UE2. In this situation, the UL signal of the UE2 may interfere with the UE1, thereby degrading the DL performance of the UE1. Such interference is an example of cross-link interference (CLI).

FIG. 9 is merely an example for describing the environment (situation) in which the CLI exists, and does not limit the technical scope of the disclosure. Therefore, environments in which CLI may exist, i.e., communication environments where DL resource and UL resource co-exist, may include, e.g., distributed antenna system/multi-cell cellular environment/integrated access and backhaul (IAB) system.

Hereinafter, the disclosure proposes methods for effectively managing cross-link interference in a wireless communication system in which cross-link interference (e.g., interference between DL transmission and UL transmission) exists. Specifically, proposal 1 proposes a method for configuring an interference measurement resource pattern for cross-link interference measurement. Proposal 2 describes an operation method for a victim UE that measures and reports cross-link interference. Proposal 3 proposes a method for defining contents/parameters for reporting information for measured cross-link interference and transmitting CLI related reports to the base station.

In the disclosure, cross-link interference (CLI) (hereinafter, CLI) may mean interference that occurs when the links of the subject causing (gives) the interference and the subject receiving the interference at a specific timing are different. For example, as in the example of FIG. 9, the interference caused by UL transmission when the interfered subject (e.g., UE1) is at the DL reception timing, but the interfering subject (e.g., UE2) is at the UL transmission timing may be CLI to the UE1.

Or, in the disclosure, if different nodes in the same network apply DL and UL at different times, CLI may mean interference that may occur between different UEs and different base stations.

Further, in the disclosure, the UE receiving interference (i.e., receiving CLI) is denoted a victim UE, and the UE causing interference (i.e., causing CLI) to another UE is denoted an aggressor UE. For convenience of description, the description focuses on UE, but the UE may be replaced with other various devices described below, such as BS, TRP, panel, or IAB node, and the description may be applied thereto.

Further, TRP described in the disclosure may mean an antenna array having one or more antenna elements available in the network that is located in a specific geographical location of a specific area. For convenience of description, the description focuses on "TRP", but the TRP may be replaced with, e.g., base station, transmission point (TP), cell (e.g., macro cell/small cell/pico cell), antenna array, or panel, and the description may be applied thereto.

<Proposal 1>

Proposal 1 proposes a method for configuring an interference measurement resource pattern for cross-link interference measurement.

As described in connection with the CSI-related operation, for downlink channel interference measurement, the UE may be configured with one or more CSI-IM resource set configurations indicated by the higher layer parameter CSI-IM-ResourceSet. Each CSI-IM resource set is composed of one or more CSI-IM resource(s).

The CSI-IM Resource IE is used to configure one CSI interference measurement (IM) resource. The CSI-IM Resource IE may include parameters, such as a CSI-IM resource identifier parameter (e.g., CSI-IM-ResourceID), a CSI-IM pattern-related parameter (e.g., CSI-IM-ResourceElementPattern), a frequency band-related parameter (e.g., freqBand), and a period and offset parameter (e.g., periodicityAndOffset).

The CSI-IM resource identifier parameter (e.g., CSI-IM-ResourceID) determines the CSI-IM resource configuration identity.

The CSI-IM pattern-related parameter (e.g., CSI-IM-ResourceElementPattern) includes a plurality of pattern information (e.g., pattern 0/pattern 1), and each pattern information includes subcarrier location (e.g., subcarrierLocation-p0/subcarrierLocation-p1) and symbol location (e.g., symbolLocation-p0/symbolLocation-p1) information. The subcarrier location defines the subcarrier occupancy of the CSI-IM resource in the slot for each pattern. The symbol location defines the OFDM symbol location of the CSI-IM resource in the slot for each pattern.

The period and offset parameter (e.g., periodicityAndOffset) defines a CSI-IM period (periodicity) and a slot offset for periodic/semi-persistent CSI-IM.

The frequency band-related parameter (e.g., freqBand) includes a parameter that enables configuration of frequency-occupancy of CSI-IM.

If in each of the PRBs configured by the frequency band-related parameter (e.g., freqBand), 'pattern 0' is set, the UE may assume that each CSI-IM resource is located in the resource elements $(k_{CSM-IM}, l_{CSI-IM})$, $(k_{CSM-IM}, l_{CSI-IM}+1)$ $(k_{CSM-IM}+1, l_{CSI-IM})$ and $(k_{CSM-IM}+1, l_{CSI-IM}+1)$. If 'pattern 1' is set, the UE may assume that each CSI-IM resource is located in the resource elements $(k_{CSM-IM}, l_{CSI-IM})$, $(k_{CSM-IM}+1, l_{CSI-IM})$, $(k_{CSM-IM}+2, l_{CSI-IM})$ and $(k_{CSM-IM}+3, l_{CSI-IM})$.

Here, $k_{CSI-IM}$ and $l_{CSI-IM}$ denote the configured frequency domain location and time domain location, respectively.

FIG. 10 illustrates an example CSI-IM resource positioned/mapped to a resource element (RE) in each PRB. (a) of FIG. 10 illustrates the CSI-IM resource of pattern 0, and (b) of FIG. 10 illustrates the CSI-IM resource of pattern 1.

Referring to FIG. 10, the CSI-IM may be configured in the form of a 2-by-2 (2×2) RE group (e.g., (a) of FIG. 10, pattern 0) within one PRB or in the form of a 4-by-1 (4×1) RE group (e.g., (b) of FIG. 10, pattern 1).

The CSI-IM pattern as shown in FIG. 10 is for measuring DL channel interference. To perform UL interference measurement, a new IMR pattern matching the pattern of RS (e.g., SRS-sounding reference signal) used for UL interference measurement is needed. In other words, when the SRS is used as the UL RS, it is transmitted as a pattern of comb 2 or comb 4 within a given set bandwidth and, given this, a new IMR pattern for CLI measurement may be configured.

For the purpose of uplink (hereinafter, UL) interference measurement, the following patterns (e.g., pattern 2/pattern 3) may further be configured/applied for the configured IMR (e.g., ZP-CSI-RS).

FIG. 11 illustrates an example new pattern of a CSI-IM resource element proposed in the disclosure.

(a) of FIG. 11 illustrates an example IMR pattern considering the case where the SRS is transmitted in the pattern of comb 2 and, for convenience of description, it is denoted pattern 2.

If 'csi-IM-ResourceElementPattern' is set to 'Pattern 2', the UE may assume that each CSI-IM resource is located in the resource elements $(k_{CSM-IM}, l_{CSI-IM})$ $(k_{CSM-IM}+2, l_{CSI-IM})$, $(k_{CSM-IM}+4, l_{CSI-IM})$, $(k_{CSM-IM}+6, l_{CSI-IM})$, $(k_{CSM-IM}+8, l_{CSI-IM})$, and $(k_{CSM-IM}+10, l_{CSI-IM})$ (b) of FIG. 11 illustrates an example of IMR pattern considering the case where the SRS is transmitted in the pattern of comb 4, which is denoted as pattern 3 for convenience.

If 'csi-IM-ResourceElementPattern' is set to 'Pattern 3', the UE may assume that each CSI-IM resource is located in the reference elements $(k_{CSM-IM}, l_{CSI-IM})$ $(k_{CSM-IM}+4, l_{CSI-IM})$ and $(k_{CSM-IM}+8, l_{CSI-IM})$ In pattern 2 and pattern 3, $k_{CSI-IM}$ and $l_{CSI-IM}$ denote the set frequency domain location and time domain location, respectively, and may be configured through higher layer signaling.

There may be considered a scheme for increasing the density (e.g., RE/RB/port, etc.) of IMR RS based on patterns 2 and 3 proposed. For example, in the IMR pattern for CLI measurement, only locations of some reference elements where the CSI-IM resource is located may be designated, and a density value may be set, so that it is possible to set the locations of all the reference elements where the CSI-IM resource is located.

It is possible to configure a pattern equivalent to the above-described pattern 2 by designating only top three locations in the "pattern 2" and setting the density to 2 RE/RB/port. In other words, as $(k_{CSM-IM}, l_{CSI-IM})$, $(k_{CSM-IM}+2, l_{CSI-IM})$, and $(k_{CSM-IM}+4, l_{CSI-IM})$ REs corresponding to no. 0 to no. 5 subcarriers may be set, and it may be agreed between the base station and the UE the locations of the remaining $(k_{CSM-IM}+6, l_{CSI-IM})$, $(k_{CSM-IM}+8, l_{CSI-IM})$, and $(k_{CSM-IM}+10, l_{CSI-IM})$, if the density is set to 2, may be applied (in the comb 2 pattern).

Or, the use of the parameter designating the density of the IMR RS may be used for setting the number of repetitions of the symbol unit. If a specific pattern along with the density of the IMR RS is indicated, it may be interpreted that the indicated specific pattern is repeated the number of times corresponding to the value set as the density of the IMR RS in symbol units.

For example, if density 2 is set in "pattern2", IMR resources may be located in $(k_{CSM-IM}, l_{CSI-IM})$, $(k_{CSM-IM}+2, l_{CSI-IM})$, $(k_{CSM-IM}+4, l_{CSI-IM})$, $(k_{CSM-IM}+6, l_{CSI-IM})$, $(k_{CSM-IM}+8, l_{CSI-IM})$, and $(k_{CSM-IM}+10, l_{CSI-IM})$, corresponding to pattern 2, and it may be agreed between the base station and the UE that the locations of the IMR resources are additionally designated in $(k_{CSM-IM}, l_{CSI-IM}+m)$, $(k_{CSM-IM}+2, l_{CSI-IM}+m)$, $(k_{CSM-IM}+4, l_{CSI-IM}+m)$, $(k_{CSM-IM}+6, l_{CSI-IM}+m)$, $(k_{CSM-IM}+8, l_{CSI-IM}+m)$, and $(k_{CSM-IM}+10, l_{CSI-IM}+m)$. In other words, pattern 2 may be repeated in 2 symbols.

m may mean the interval between patterns on the time axis. The value of m may be agreed between the base station and the UE in advance. For example, as consecutive values, 1 or −1 may be agreed. Alternatively, the base station may designate/set the value of m to the UE through a higher layer. Alternatively, the value of m may be determined/applied according to a density value or a separate indicator (e.g., repetition factor, etc.). This is for better measuring interference when repeatedly transmitting the SRS for coverage enhancement.

The IMR resource configured by the above proposals may be explicitly differentiated depending on the target link (e.g., DL or UL or SL) and configured in the UE. In other words, an IMR resource may be configured using the resource set IDs of different CSI-IMs or different parameters depending on the target link.

The UE may measure the UL CLI based on the patterns of proposal 1 described above. In other words, the UE may measure the CLI under the assumption that interference measurement resources are located in the patterns of proposal 1.

<Proposal 2>

Proposal 2 of the disclosure describes an operation method for a victim UE that measures and reports cross-link interference.

As described above, the UE receiving CLI is denoted as a victim UE, and the UE causing CLI to the victim UE is denoted as an aggressor UE. Further, for convenience of description, it is assumed that CLI occurs due to the UL operation of the aggressor UE in the DL process of the victim UE. However, the technical scope of the disclosure is not limited by such assumption, and thus, it may also be applicable where CLI is caused due to the DL operation of the aggressor UE in the UL process of the victim UE.

Further, for convenience of description, the reference signal (hereinafter, RS) that the aggressor UE transmits for interference measurement of the victim UE is denoted as CLI-RS.

FIG. 12 illustrates an example of signaling of a transmission/reception process between the base station, aggressor UE, and victim UE in a wireless communication system to which the method proposed in the disclosure is applicable, an example for describing the operation of measuring and reporting CLI by the victim UE. FIG. 12 is intended merely for illustration purposes but not for limiting the technical scope of the disclosure.

The base station may transmit CLI-RS transmission-related configuration information to the aggressor UE(s) (S1205). For example, the configuration information may include CLI-RS pattern information, CLI-RS reception timing information, and/or IMR-related information configured to the victim UE.

Further, the base station may transmit interference measurement resource (IMR)-related information to the victim UE (S1210). As an example, the IMR may include a ZP CSI-RS and/or an NZP CSI-RS.

The aggressor UE(s) may transmit the CLI-RS based on configuration information related to CLI-RS transmission (S1215). In this case, the CLI-RS may be transmitted by targeting the IMR resource configured to the victim UE or may be transmitted at the slot timing when the IMR is configured. For example, the aggressor UE(s) may transmit the CLI-RS (e.g., SRS) in the DL IMR RE pattern (e.g., pattern 2 or pattern 3 of proposal 1) for interference measurement of the victim UE. The CLI-RS transmitted by the aggressor UE may cause CLI to the victim UE.

The victim UE may measure the CLI based on information/using IMR (e.g., ZP/NZP CSI-RS)-related information received from the base station (S1220). In other words, the victim UE may perform interference measurement based on the IMR (e.g., ZP/NZP CSI-RS). The victim UE may measure the CLI using the CLI-RS transmitted by the aggressor UE. Further, the victim UE may calculate the CSI using the CLI.

For example, the victim UE may measure/calculate the strength (i.e., received signal strength indicator (RSSI)) of the signal received in the RE corresponding to the IMR (e.g., ZP/NZP CSI-RS) resource. As another example, the victim UE may also perform interference measurement/calculation with, e.g., reference signal received power (RSRP). In this case, it is possible to obtain more accurate information, e.g., interference amount/direction, targeting the specific reference signal. However, sequence-related information for decoding the CLI-RS decoding may be previously agreed between the UE and the base station, or the base station may configure sequence-related information to the victim UE. For example, the base station may configure the UE (e.g., the victim UE) with whether to perform RSSI-based interference measurement or perform RSRP-based interference measurement. Alternatively, information to be measured by the UE, i.e., whether RSRP, RSSI or RSRP and RSSI, may be predefined.

The victim UE may report CSI including CLI-related information to the base station (S1230).

Although the description in connection with FIG. 12 focuses primarily on the context where there is one aggressor UE for convenience of description, there may be a plurality of aggressor UEs. For example, if the plurality of aggressor UEs exist in similar locations so that the interference with the victim UE has similar characteristics, a common CLI-RS may be configured for the aggressor UEs. For example, the common CLI-RS may mean the CLI-RS transmitted based on common configuration information (e.g., CLI-RS pattern information/RS timing information/slot timing when IMR is configured) to the plurality of aggressor UEs. For example, if the common CLI-RS is configured for the aggressor UEs, a representative UE among the plurality of aggressor UEs may perform the operation of transmitting the CLI-RS in step S1215 described above.

Further, proposal 2 may be extended to the RE pattern configured as the NZP-CSI-RS for interference measurement.

The above-described proposal may be used for the purpose of interference control in a severe CLI scenario. However, precise SINR measurement requires an IMR resource for interference measurement and background noise as well as an IMR resource for CLI-RS. To that end, separately from the IMR for CLI measurement, IMR resources (e.g., ZP-CSI-RS) for background noise and interference measurement may be simultaneously configured. In other words, a plurality of IMR resources may be configured and be distinguished for CLI measurement and background noise and interference measurement. In this case, the UE may not expect superposition between the two resources. Further, the two resources may be TDMed or FDMed and transmitted.

For example, the IMR pattern (e.g., pattern 2/pattern 3) for CLI measurement proposed in proposal 1 and the existing IMR pattern (e.g., pattern 0/pattern 1) may be simultaneously configured, and the IMR pattern for CLI measurement and the existing IMR pattern may be configured not to overlap.

<Proposal 3>

As described above, the CSI report content that should be reported by the UE may be configured through the higher layer parameter 'reportQuantity.' The 'reportQuantity' parameter may be included in the CSI-ReportConfig IE. Based on the 'reportQuantity' parameter, report content, such as CRI/RI/PMI/CQI/RSRP/SINR may be configured/indicated. However, the current 'reportQuantity' does not define report content for CLI. Thus, proposal 3 of the disclosure proposes a method for defining contents/parameters for reporting information for measured cross-link interference and transmitting CLI related reports to the base station.

To report interference measured by the UE, in particular, CLI, the following new CSI report content (or CSI-related parameter) may be defined.

CLI indicator: A parameter for indicating a preferred CLI-RS among a plurality of CLI-RSs configured by the base station when the plurality of CLI-RSs are configured/applied.

For example, the CLI indicator may be set per resource unit. As an example, the CLI indicator may indicate a single CLI-RS resource with the worst or best CLI performance among the plurality of CLI-RSs. Alternatively, the CLI indicator may indicate all of the worst CLI-RS and the best CLI-RS resources. Alternatively, the CLI indicator may indicate some CLI-RSs among the plurality of CLI-RSs configured by the base station and, in this case, a specific state(s) in the bit width of the CLI indicator may indicate a single CLI-RS, and the specific state(s) may indicate a plurality of CLI-RSs.

CLI RSRP: A parameter indicating the strength of interference measured from CLI-RS.

For example, the CLI RSRP may indicate the strength of the measured interference based on the CLI-RS resource reported by the CLI indicator.

For example, when a plurality of CLI-RSs are indicated by the CLI indicator, to reduce the feedback payload for CLI reporting, a differential RSRP value may be reported with respect to a specific CLI-RS. As an example, the differential RSRP values may be reported in ascending or descending order of index, with respect to the RSRP value of the CLI-RS with the lowest or highest index based on the index of CLI-RS among the plurality of CLI-RSs reported through the CLI indicator. Alternatively, the differential RSRP values may be reported with respect to the CLI-RS with the largest RSRP value.

CLI INR: denotes the interference to noise ratio (INR).

CLI CQI: is the CQI calculated by reflecting CLI and may be used to be differentiated from the CQI calculated without reflecting CLI.

At least one of the CSI report contents for the above-described CLI reporting may be newly introduced. The base station may indicate, to the UE, the CSI report content/parameters for CLI reporting described in proposal 3 through higher layer signaling. As an example, CLI_indicator-CLI-RSRP may be configured by the reportQuantity parameter, and the UE may report the CLI indicator and CLI RSRP to the base station.

For effective interference measurement, the base station may be periodically/semi-persistently/aperiodically reported for the interference (e.g., CLI) with the UE. In other words, the UE may periodically/semi-persistently/aperiodically transmit a report for the CLI using all or some of the above-described CSI report contents for CLI reporting to the base station. The time domain behavior of reporting on CLI may be configured to be identical to or different from the conventional time domain operation for CSI reporting.

For example, the base station may be periodically reported for normal CQI from the UE and, to predict the degree of CLI experienced by the UE, receive a report for the CLI-containing CQI by configuring (e.g., configuring separately as "reportQuantity") the CLI-CQI as an aperiodic CSI reporting setting. In this case, the time domain behavior of the existing CSI reporting that does not consider CLI and the time domain behavior of the CLI reporting that considers CLI may be set to differ from each other.

Further, the measurement restriction may be set to differ depending on the time domain behavior set by the CSI reporting setting upon measurement of the CQI/INR/RSRP related to CLI, and the UE may perform CSI reporting (e.g., CLI CQI/CLI RSRP/CLI INR/CLI indicator, etc.).

For example, in the case of aperiodic reporting, the UE may measure CLI one-shot and calculate/report CSI (e.g., CLI CQI/CLI RSRP/CLI INR/CLI indicator, etc.). In the case of periodic/semi-persistent CSI reporting, CSI (e.g., CLI CQI/CLI RSRP/CLI INR/CLI indicator, etc.) may be calculated/reported using the filter output (e.g., average filter) of the interference values measured based on the CLI-RS in a specific time window set by the base station or previously agreed for interference measurement.

An IMR pattern for CLI measurement may be configured through the above-described proposed methods (e.g., proposal 1/proposal 2/proposal 3), and CLI may be measured and reported to the base station. The UE may enable more accurate reporting on the channel state by reporting the CSI even considering the CLI, and the base station may configure a channel environment optimized for the UE based on the CLI-considered CSI.

The above-described proposed methods (e.g., proposal 1/proposal 2/proposal 3) may be applied independently, in combination, or with some components substituted.

Described below is an integrated access and backhaul (IAB) system which is an example environment where CLI may exist. Further, an embodiment in which the above-described proposed methods (e.g., proposal 1/proposal 2/proposal 3) are applied in the IAB system is described.

Integrated Access and Backhaul (IAB) Links

With the expansion of massive MIMO, multi-beam system and/or available frequency bandwidth (e.g., mmWave spectrum) in the NR system, a method (e.g., IAB links) for supporting radio backhaul (hereinafter, BH) and relay links is taken into consideration. This allows for very dense deployment of NR cells. Further, the integrated access and backhaul (IAB) (hereinafter, IAB) may provide efficient operation of radio backhaul and integrated access for the UE and, as NR cells may be arranged densely, it may be used for small cells, indoor environment, or mobile relays (e.g., buses or trains). Further, due to a short range of mmWave access, it is required to extend wireless backhauling to multiple hops, and multi-hop backhauling may enhance flexibility upon using self-backhauling in a dense urban environment where the backhaul path needs to be adaptively changed depending on the infrastructure.

FIG. 13 illustrates an example of IAB. FIG. 13 is intended merely for illustration purposes but not for limiting the scope of the disclosure. Here, the IAB-node (relay node) may multiplex access and backhaul links in time, frequency and/or space (e.g., beam-based operation).

With reference to FIG. 13, the IAB configuration and link are described.

The IAB-node is a RAN node that supports (i) radio access links for UEs and (ii) radio backhaul links for parent nodes and child nodes.

Parent node means the next hop neighbor node of IAB-node-MT (Mobile Termination). Parent node may be an IAB-node or an IAB-donor-DU.

Child node means the next hop neighbor node of IAB-node-DU (Distributed Unit). Child node also corresponds to IAB-node.

The direction of the parent node of IAB-topology is called upstream, and the direction of the child node of IAB-topology or UE is called downstream.

Access link means a link between the access UE and IAB-node or IAB-donor. Backhaul link means a link between the IAB-node and the IAB child node or IAB parent node. The IAB may include an access link and a backhaul link, and the access link and backhaul link may operate on the same or different frequencies (in-band and out-of-band relays).

The Mobile Termination (MT) function is defined as a component of mobile equipment. In IAB, MT means a function residing in the IAB-node that terminates the radio interface layers of the backhaul Uu interface towards the IAB-donor or other IAB-node.

FIG. 14 illustrates an example of IAB architecture. FIG. 14 is intended merely for illustration purposes but not for limiting the technical scope of the disclosure.

The IAB-donor is the terminating node of NR backhauling in terms of network and refers to a RAN node that provides an interface for core network access to the UE and provides radio backhaul links to the IAB-node. The IAB-donor may correspond to one logical node including the functions of gNB-DU, gNB-CU-CP, and gNB-CU-UP.

The gNB-CU (Central Unit) is a logical node that hosts the RRC, SDAP and PDCP protocols of the gNB or the RRC and PDCP protocols of the en-gNB that controls the operation of one or more gNB-DUs.

The gNB-DU (Distributed Unit) is a logical node that hosts the RRC, MAC, and PHY layers of the gNB or en-gNB.

The IAB-node may support i) NR access interface termination for UE and IAB-nodes and ii) gNB-DU functionality supporting the F1 protocol for gNB-CU on the IAB-donor. Further, the IAB-node may also support i) connection with the DU of another IAB-node or IAB-donor and ii) NR Uu radio interface (i.e., MT functionality) for connecting with the gNB-CU on the IAB-donor through RRC.

In FIG. 14, connection between the gNB-CU and the gNB-DU may be supported by the F1 interface. In this case, the gNB-CU and the gNB-DU may be ones provided from another producer. Hereinafter, the F1 interface is described in detail.

The F1 interface supports signaling information exchange between endpoints and data transmission for each endpoint. Further, the F1 interface may support the interface separately for the control plane (CP) and the user plane (UP) (e.g., F1-C and F1-U) and may support the interface for each of the radio network layer and the transport network layer. One gNB-CU (Central Unit) and one set of gNB-DUs (Distributed Units) may be shown, as gNBs or en-gNBs to other logical nodes, and the gNB-CU may be divided into the CP and the UP. In this case, connection between the gNB-CU and the gNB-DU may be related with the F1 interface.

The F1 interface may support the procedures for setting up, maintaining, and releasing radio bearers for E-UTRAN radio access bearers and NG-RAN part of the PDU session. Further, the F1 interface may support separation of each UE and transmission of RRC signaling messages between UE and gNB-CU at the protocol level for user-specific signaling management.

The IAB may again use the conventional functions and interfaces defined for access. As an example, the NR Uu interface may be used in the access link, and the above-described F1 interface may be extended and applied to the backhaul link. For example, if the F1 interface is applied to the backhaul link, the gNB-DU may be interpreted as the IAB-node, and the gNB-CU may be interpreted as the IAB-donor.

FIG. 15 illustrates an example of signaling of a UE and a one-hop chain IAB. In other words, FIG. 15 shows an example of single hop backhauling between the IAB-node and the IAB-donor. FIG. 15 is intended merely for illustration purposes but not for limiting the scope of the disclosure. Since IAB may support multi-hop backhauling, it may be extended and applied to backhauling involving two or more IAB nodes. The order of links in each step of FIG. 15 may be replaced, omitted, or changed.

In FIG. 15, IAB-node1 may correspond to the child node, and IAB-node2 may correspond to the parent node. In the case of single hop backhauling, it may be assumed that IAB-node1 is the IAB-node and IAB-node2 is the IAB-donor. Further, the access link between the UE and IAB-node1 and the backhaul link between the IAB-node1 and IAB-node2 may correspond to a radio link. Further, the above-described F1 interface may be applied between the IAB-node 1 and the IAB node 2.

A transmission/reception procedure between the UE and the IAB nodes based on the IAB of FIG. 15 is described in detail.

The UE may transmit IAB-based first UL information (e.g., control information, data, etc.) to the IAB node 1 through the UL access link (S1510).

Based on the IAB-based first UL information received from the UE, IAB node 1 may transmit the IAB-based second UL information to IAB node 2 through the UL backhaul link (S1520).

IAB node 2 receiving the IAB-based second UL information from IAB node 1 may transmit IAB-based first DL information (e.g., control information and data) to IAB node 1 through the DL backhaul link (S1530).

Based on the IAB-based first DL information received from IAB node 2, IAB node 1 may transmit IAB-based second DL information to the UE through the DL access link (S1540).

The downlink transmission of IAB-node (e.g., DL backhaul link transmission of child IAB-node from IAB-node (S1530) and/or DL access link transmission of UE from IAB-node (S1540)) may be scheduled by the IAB-node itself. The uplink IAB-node transmission (e.g., transmission of parent node or IAB-donor from IAB-node (S1520)) may be scheduled by the parent IAB-node or IAB-donor.

Specific examples of the operation related to the above-described backhaul link may be described as follows.

1) IAB-node initial access

In the SA deployment, for initial connection establishment with the parent IAB-node or IAB-donor, initial IAB-node discovery may be performed by the MT of the IAB-node. In Rel-15, the initial IAB-node discovery process may be performed in the same manner as the UE's initial access procedure IAB-node cell search based on the same SSBs available for access UEs, SI acquisition, and random access.

In the case of NSA deployment (from the point of view of the access UE), when the IAB-node MT performs initial access on NR carrier, it may follow the same initial access as in the SA deployment. When the IAB-node MT performs initial access in the LTE carrier, the MT of the NR carrier may select the parent IAB-node according to the inter IAB-node discovery and measurement.

As a specific example, the UE may transmit an RRCsetupRequest through the UL access link, and IAB-node 1 may transmit an Initial UL message to IAB-node2 (IAB-donor) through the UL backhaul link. IAB-node 2 (IAB-donor) may transmit the DL message to IAB-node 1 through the DL backhaul link and, upon receiving the DL message, IAB-node 1 may transmit the RRCsetup to the UE through the DL access link.

2) Inter IAB-node discovery and measurement

For the RSRP/RSRQ RRM measurement of the backhaul link, the IAB may support all SSB- and CSI-RS-based solutions. Further, after the IAB-node DU is activated, inter-IAB-node and IAB-donor detection may be supported. The inter-IAB-node discovery procedure may support methods, such as i) reuse of the SSBs set used for access UEs, ii) use of the SSB orthogonal (TDMed and/or FDMed) with the SSB used for access UEs, and iii) use of CSI-RS for inter IAB-node detection in the synchronous network.

3) IAB RACH

The IAB may support a flexible network function by configuring additional preamble formats for allowing a backhaul RACH resource having a different occasion relative to the access RACH resource, a longer RACH period, and a longer RTT. Further, the network may configure an offset for the PRACH occasions for the MT of the IAB-node(s) for the TDM backhaul RACH resource over an adjacent hop, based on the Rel-15 PRACH configuration.

4) Backhaul Link Management

The IAB-node may support a mechanism for detecting/recovering the backhaul link failure based on the Rel-15 mechanism. For example, the beam failure recovery and radio link failure procedure may also be supported in the IAB.

Cross-link interference (CLI) may also occur in the above-described IAB system.

For example, UL transmission between an IAB-node and an IAB child node/IAB parent node may be performed through a backhaul link during DL transmission between an access UE and an IAB-node through an access link. In this case, the access UE may receive CLI due to UL transmission on the backhaul link. In other words, the access UE may correspond to the above-described victim UE, and the IAB-node on the backhaul link may correspond to the aggressor UE.

As another example, CLI may occur between downstream between IAB-node and IAB child node and upstream between IAB-node and IAB parent node.

As another example, CLI may also occur between the interface between the IAB-donor-CU and the IAB-donor-DU and the interface between the IAB-donor-CU and the IAB-node.

When CLI occurs in the IAB system, CLI may be measured based on the methods (e.g., proposal 1/proposal 2/proposal 3) proposed in the disclosure, and a report on the measured CLI may be transferred to the base station.

FIG. 16 illustrates an example signaling procedure between a base station and a UE to report CSI including a report for CLI to which methods (e.g., proposal 1/proposal 2/proposal 3) proposed in the disclosure are applicable. FIG. 16 is intended merely for illustration purposes but not for limiting the technical scope of the disclosure. Some steps shown in FIG. 16 may be omitted according to situations and/or configurations. Further, the operations of FIG. 16 may be performed based on the description of the above-described CSI-related operations. Referring to FIG. 16, it may be assumed that the UE performs CSI reporting according to the configuration and/or instruction of the base station, and the CSI reporting may be configured periodically/semi-persistently/aperiodically.

In FIG. 16, it is assumed that two UEs (e.g., UE1/UE2) operate for CSI measurement/reporting considering cross-link interference. Further, in connection with FIG. 16, it is described that UE1 is the interfered victim UE and UE2 is the interfering aggressor UE. However, since this is merely an example for convenience of description, UE1 and UE2 may be operated as the victim/aggressor or aggressor/victor therebetween. It may also be applicable to environments where three or more UEs operate. Further, the UEs of FIG. 16 may be replaced with TRPs or IAB-nodes.

Further, although the description of FIG. 16 focuses primarily on an example context in which CLI occurs due to UL transmission by another UE from a point of view of the victim UE receiving DL, it may also be applicable to the context where CLI occurs due to DL transmission by another UE from a point of view of the victim UE transmitting UL.

The base station may transmit CSI-related configuration information and/or CSI-related indication to UE1 and UE2 (S1610-1/S1610-2). In other words, UE1 and UE2 may receive the CSI-related configuration information and/or CSI-related indication from the base station. The CSI-related configuration information and/or indication may be transferred from the base station to the UE via, e.g., RRC signaling/MAC-CE-based signaling/DCI.

For example, the CSI-related configuration information may include multiple configurations (e.g., CSI reporting setting(s) or CSI-related resource setting(s)) related to CSI reporting. As an example, the CSI-related indication may include information indicating a specific configuration among the multiple configurations related to the CSI reporting and specific indication information (e.g., timing-related information) related to the CSI reporting.

As an example, in S1610-2, the CSI-related configuration information received by UE2 may be SRS-related configuration information.

For example, the CSI-related configuration information and/or CSI-related indication may be based on the above-described proposed methods (e.g., proposal 1/proposal 2/proposal 3). For example, as described above in connection with proposal 1/proposal 2/proposal 3, the CSI-related configuration information and/or CSI-related indication that the BS transmits to UE1 (UE1 receives from the BS) may include interference measurement resource (IMR)-related information for CSI measurement. As an example, the IMR-related information may include IMR pattern information configured considering the transmission pattern of the UL RS (e.g., SRS). As an example, the UL RS may correspond to the RS for measuring interference due to the UL transmission of UE2 when UE1 receives DL from the BS.

For example, as described above in connection with proposal 1/proposal 2/proposal 3, the CSI-related configuration information and/or CSI-related indication (S1610-2) that the BS transmits to UE2 (UE2 receives from the BS) may include information related to CLI-related RS (e.g., CLI-RS) transmission. As an example, the information related to the CLI-related RS (e.g., CLI-RS) transmission may include CLI-RS pattern/RS reception timing information/information related to the IMR configured to UE1. For example, the CSI-related configuration information and/or CSI-related indication may include configuration information (e.g., timing-related information/CLI-related CSI parameter-related information) for CLI-related CSI reporting.

UE2 may transmit a CLI-related reference signal (RS) (e.g., CLI-RS) (S1620). The CLI-related RS may act as interference (e.g., CLI) with another UE (e.g., UE1). For example, in relation to CSI reporting in the above-described proposed methods (e.g., proposal 1/proposal 2/proposal 3), UE1 may receive CLI-related RS (e.g., CLI-RS) based on the CSI-related configuration information and/or CSI-related indication for CSI reporting. For example, the CLI-related RS may be an SRS that UE2 transmits to the BS.

UE1 may measure CSI based on the CSI-related configuration information, the CSI-related indication, and/or the CLI-related RS and transmit CSI to the BS (i.e., perform CSI reporting) (S1630). The BS may receive the transmitted CSI reporting from UE1 based on the CSI-related configuration information, the CSI-related indication, and/or the CLI-related RS. For example, the CSI reporting may be based on the above-described proposed methods (e.g., proposal 1/proposal 2/proposal 3).

For example, as described in connection with proposal 1/proposal 2/proposal 3, UE1 may perform interference (e.g., CLI) measurement based on the IMR-related configuration information. For example, the interference may be interference generated by DL/UL operation of UE2 during UE1's UL/DL. As an example, UE1 may measure interference based on the CLI-related RS (e.g., CLI-RS) transmitted by UE2. As an example, the CLI-RS may be the CLI-RS transmitted by UE2 at the slot timing/targeting the IMR configured in UE1.

For example, as described in connection with proposal 1/proposal 2/proposal 3, the BS may receive the CSI including the interference (e.g., CLI)-related information measured based on the IMR-related configuration information. As an example, the interference may be measured based on the CLI-RS transmitted by UE2 at the slot timing/targeting the IMR configured in UE1.

For example, as described in connection with proposal 1/proposal 2/proposal 3, new CLI-related CSI parameters (e.g., CLI indicator/CLI RSRP/CLI INR/CLI CQI) for CSI reporting on CLI may be calculated/reported. As an example, the CSI reporting on CLI may be reported periodically/semi-periodically/aperiodically. For example, the CSI reporting on CLI may be reported based on the existing reporting period of CSI reporting. As an example, the periodic/semi-periodic/aperiodic CSI reporting on CLI may be performed through PUCCH or PUSCH.

In FIG. 16 and the description in connection with FIG. 16, the CSI reporting on CLI may be included in/replaced with normal CSI reporting and be described.

Further, the BS/UE operations of FIG. 16 may also be applied to the IAB system where DL and UL resources coexist. When the above-described proposed methods (e.g., proposal 1/proposal 2/proposal 3/FIG. 16) apply to the IAB system, they may be applied by referring to the operations of the above-described IAB links. For example, the BS may correspond to the IAB node, UE1 may correspond to the child node/parent node, and UE2 may correspond to the parent node/child node. Or, for example, the BS may correspond to the IAB node, UE1 may correspond to the UE, and UE2 may correspond to the child node/parent node. Or, for example, the BS may be replaced with a CU, and the UE may be replaced with a DU.

For example, the above-described BS/UE operations of FIG. 16 may be implemented by the device of FIGS. 19 to 23 described below. For example, referring to FIG. 20, one or more processors 102 may enable the BS/UE operations of FIG. 16 to be performed to control one or more transceivers 106 and/or one or more memories 104.

FIG. 17 illustrates an example of a CSI reporting operation flowchart of a user equipment (UE) to which methods (e.g., proposal 1/proposal 2/proposal 3) proposed in the disclosure are applicable. For example, the UE may include one or more transceivers, one or more processors, and one or more memories storing instructions for operations executed by the one or more processors and connected with the one or more processors. FIG. 17 is intended merely for illustration purposes but not for limiting the scope of the disclosure. Some steps shown in FIG. 17 may be omitted according to situations and/or configurations.

The UE may receive CSI-related configuration information from the base station (S1710). For example, the configuration information may be received through RRC signaling.

The configuration information may include at least one of CSI-IM (interference management) resource (resource)-related information (e.g., second configuration), CSI measurement configuration, CSI resource configuration-related information (e.g., first configuration), CSI-RS resource-related information, or CSI report configuration. Further, the configuration information may include information related to cross-link interference.

For example, the CSI-IM resource-related information (e.g., CSI-IM Resource IE) may include parameters, such as a CSI-IM resource identifier parameter (e.g., CSI-IM-ResourceID), a CSI-IM pattern-related parameter (e.g., CSI-IM-ResourceElementPattern), a frequency band-related parameter (e.g., freqBand), and a period and offset parameter (e.g., periodicityAndOffset). As an example, the CSI-IM pattern-related parameter may include pattern information for the CSI-IM resource, and through the pattern information, the subcarrier location (e.g., subcarrierLocation-p0/subcarrierLocation-p1) and the symbol location (symbolLocation-p0/symbolLocation-p1) may be indicated.

For example, as described in the above-mentioned proposal 1, the second configuration for the interference measurement resource (i.e., the CSI-IM resource-related information) may include pattern information for resources for the measurement of cross-link interference. As an example, the subcarrier start location of the resources for measurement of cross-link interference may be determined based on the pattern information, and the resources for measurement of cross-link interference may be located in the form of comb 2 or comb 4 from the start location, in the frequency domain.

For example, the second configuration may further include density information for the resources for measurement of cross-link interference. The number of times in which the pattern of the resources for the measurement of cross-link interference is repeated may be determined based on the density information. As an example, the pattern may be repeated with a specific interval in the time domain, based on the density information. The specific interval may be 1 or -1. Or, information for the specific interval may be received from the base station.

For example, the second configuration for the interference measurement resource (i.e., the CSI-IM resource-related information) may further include information for resources for interference measurement and background noise. In this case, (i) resources for measurement of cross-link interference and (ii) resources for background noise and interference measurement may not overlap. As an example, it may be located in the resources where (i) the resources for measurement of cross-link interference and (ii) the resources for background noise and interference measurement do not overlap, based on an FDM or TDM scheme.

For example, the CSI report configuration (e.g., CSI-ReportConfig IE) may include a 'reportQuantity' parameter and a 'reportConfigType' parameter. Based on the 'reportQuantity' parameter, report content, such as CRI/RI/PMI/CQI/RSRP/SINR may be configured/indicated.

For example, as described in the above-mentioned proposal 3, the configuration information may further include a parameter for indicating contents of a report on the cross-link interference. As the parameter, the 'reportQuantity' parameter of the CSI report configuration may be used. Based on the parameter for indicating the contents of the report on cross-link interference, at least one report content of cross-link interference (CLI)-related CQI, CLI-related interference to noise ratio (INR), CLI-related RSRP or CLI-related indicator may be indicated/configured.

For example, periodic, aperiodic or semi-persistent CSI reporting may be configured through the 'reportConfigType' parameter.

For example, the operation of receiving configuration information by the UE (100/200 of FIGS. 19 to 23) in the above-described step S1710 may be implemented by a device as illustrated in FIGS. 19 to 23 described below. For example, referring to FIG. 20, one or more processors 102 may control one or more transceivers 106 and/or one or more memories 104 to receive the configuration information, and one or more transceivers 106 may receive the configuration information.

The UE may receive downlink control information (DCI) from the base station (S1720). The DCI may be transmitted through a control channel (e.g., PDCCH). The DCI may include at least one of i) a transmission configuration indication (TCI) field, ii) an antenna port field, or iii) a frequency resource assignment field. For example, based on the DCI, aperiodic CSI reporting may be triggered. In the case of periodic or semi-persistent CSI reporting, the operation of receiving the DCI of step S1720 may be omitted.

For example, the operation of receiving downlink control information by the UE (100/200 of FIGS. 19 to 23) in the above-described step S1720 may be implemented by a device as illustrated in FIGS. 19 to 23 described below. For example, referring to FIG. 20, one or more processors 102 may control one or more transceivers 106 and/or one or more memories 104 to receive DCI, and one or more transceivers 106 may receive the DCI.

The UE may receive a reference signal based on the configuration information (S1730). For example, the reference signal may be a CSI-RS. The reference signal may be transmitted periodically, aperiodically or semi-persistently.

For example, the operation of receiving the reference signal by the UE (100/200 of FIGS. 19 to 23) in the above-described step S1730 may be implemented by a device as illustrated in FIGS. 19 to 23 described below. For example, referring to FIG. 20, one or more processors 102 may control one or more transceivers 106 and/or one or more memories 104 to receive the reference signal, and one or more transceivers 106 may receive the reference signal.

The UE may measure cross-link interference (CLI) and/or CSI (S1740). In other words, the UE may measure CLI or CSI or CLI and CSI.

For example, the UE may measure the CLI based on information/using IMR (e.g., ZP/NZP CSI-RS)-related information received from the base station. For example, the UE may measure/calculate the strength (RSSI)/RSRP of the signal received in the RE corresponding to the IMR (e.g., ZP/NZP CSI-RS) resource. For example, the cross-link interference may be interference generated by uplink transmission of another UE when the UE receives the reference signal.

For example, the IMR pattern for CLI measurement may be determined based on the above-mentioned proposal 1. For example, considering the SRS pattern, a pattern may be configured in the form of comb 2 or comb 4.

For example, the operation of measuring the CLI and CSI by the UE (100/200 of FIGS. 19 to 23) in the above-described step S1740 may be implemented by a device as illustrated in FIGS. 19 to 23 described below. For example, referring to FIG. 20, one or more processors 102 may control one or more transceivers 106 and/or one or more memories 104 to measure the CLI and CSI.

The UE may transmit a CSI report to the base station (S1750). The CSI report may include report contents indicated based on configuration information. For example, the CSI report may include a report on the CLI, and the report content for the CLI may include at least one of cross-link interference (CLI)-related CQI, CLI-related interference to noise ratio (INR), CLI-related RSRP or CLI-related indicator. Alternatively, the report on the measured cross-link interference may include a reference signal received power (RSRP) or a reception signal strength indicator (RSSI) for the cross-link interference.

For example, the CSI report may be transmitted periodically, aperiodically or semi-persistently. For example, the CSI report including the CLI report and the CSI report including no CLI report may be configured to have different time domain behaviors. For example, a report on cross-link interference including at least one report content may be transmitted periodically, semi-persistently, or aperiodically.

For example, the operation of transmitting the CSI report by the UE (100/200 of FIGS. 19 to 23) in the above-described step S1750 may be implemented by a device as illustrated in FIGS. 19 to 23 described below. For example, referring to FIG. 20, one or more processors 102 may control one or more transceivers 106 and/or one or more memories 104 to transmit the CSI report, and one or more transceivers 106 may transmit the CSI report.

FIG. 18 illustrates an example of a CSI receiving operation flowchart of a base station (BS) to which methods (e.g., proposal 1/proposal 2/proposal 3) proposed in the disclosure are applicable. FIG. 18 is intended merely for illustration purposes but not for limiting the scope of the disclosure. Some steps shown in FIG. 18 may be omitted according to situations and/or configurations.

The base station described in the disclosure may refer to an object that transmits/receives data to/from the UE. For example, the base station may include one or more transceivers, one or more processors, and one or more memories storing instructions for operations executed by the one or more processors and connected with the one or more processors. For example, the base station may be a concept including one or more TPs (Transmission Points) and one or more TRPs (Transmission and Reception Points), and the like.

Further, the TP and/or TRP may include a panel of a base station, a transmission and reception unit, and the like. Further, the TRP may be classified according to information (e.g., index, ID) about the CORESET group (or CORESET pool). As an example, when one UE is configured to perform transmission/reception with a plurality of TRPs (or cells), this may mean that a plurality of CORESET groups (or CORESET pools) are configured for one UE. The configuration of such a CORESET group (or CORESET pool) may be performed through higher layer signaling (e.g., RRC signaling, etc.).

The base station may transmit CSI-related first configuration information to the first UE (S1810). For example, the first UE may correspond to the victim UE. For example, the configuration information may be received through RRC signaling.

For example, the configuration information may include information related to cross-link interference. The configuration information may include a first configuration for a CSI resource and a second configuration for an interference measurement resource.

For example, the second configuration (e.g., CSI-IM resource-related information) for the interference measurement resource may include parameters, such as a CSI-IM resource identifier parameter (e.g., CSI-IM-ResourceID), a CSI-IM pattern-related parameter (e.g., CSI-IM-ResourceElementPattern), a frequency band-related parameter (e.g., freqBand), and a period and offset parameter (e.g., periodicityAndOffset). As an example, the CSI-IM pattern-related parameter may include pattern information for the CSI-IM resource, and through the pattern information, the subcarrier location (e.g., subcarrierLocation-p0/subcarrierLocation-p1) and the symbol location (symbolLocation-p0/symbolLocation-p1) may be indicated.

For example, as described in the above-mentioned proposal 1, the second configuration for the interference measurement resource (i.e., the CSI-IM resource-related information) may include pattern information for resources for the measurement of cross-link interference. As an example, the subcarrier start location of the resources for measurement of cross-link interference may be determined based on the pattern information, and the resources for measurement of cross-link interference may be located in the form of comb 2 or comb 4 from the start location, in the frequency domain.

For example, the second configuration may further include density information for the resources for measurement of cross-link interference. The number of times in which the pattern of the resources for the measurement of cross-link interference is repeated may be determined based on the density information. As an example, the pattern may be repeated with a specific interval in the time domain, based on the density information. The specific interval may be 1 or −1. Or, information for the specific interval may be received from the base station.

For example, the second configuration for the interference measurement resource (i.e., the CSI-IM resource-related information) may further include information for resources for interference measurement and background noise. In this case, (i) resources for measurement of cross-link interference and (ii) resources for background noise and interference measurement may not overlap. As an example, it may be located in the resources where (i) the resources for measurement of cross-link interference and (ii) the resources for background noise and interference measurement do not overlap, based on an FDM or TDM scheme.

For example, as described in the above-mentioned proposal 3, the configuration information may further include a parameter for indicating contents of a report on the cross-link interference. As the parameter, the 'reportQuantity' parameter of the CSI report configuration may be used. Based on the parameter for indicating the contents of the report on cross-link interference, at least one report content of cross-link interference (CLI)-related CQI, CLI-related interference to noise ratio (INR), CLI-related RSRP or CLI-related indicator may be indicated/configured.

For example, the operation of transmitting first configuration information by the base station (100/200 of FIGS. 19 to 23) in the above-described step S1810 may be implemented by a device as illustrated in FIGS. 19 to 23 described below. For example, referring to FIG. 20, one or more processors 102 may control one or more transceivers 106 and/or one or more memories 104 to transmit the first configuration information, and one or more transceivers 106 may transmit the first configuration information.

The base station may transmit second configuration information to the second UE (S1820). For example, the second UE may correspond to the aggressor UE. The second configuration information may be received through RRC signaling. For example, the second configuration information may include a configuration for a reference signal (e.g., CLI-RS) related to cross-link interference measurement of the first UE. The reference signal related to the cross-link interference measurement of the first UE may mean the above-described CLI-RS. As an example, for measurement of the CLI caused due to UL transmission of the second UE for DL reception of the first UE, the second UE may be configured with an SRS with the CLI-RS.

For example, the configuration for the reference signal (e.g., CLI-RS) may include, e.g., information in which the CLI-RS is transmitted and transmission timing information. As an example, the pattern information in which the CLI-RS is transmitted and the transmission timing may be configured based on the location/pattern of the interference measurement resources configured to the first UE. The CLI-RS may be transmitted by the second UE based on the location/pattern of the interference measurement resources configured to the first UE.

For example, the operation of transmitting second configuration information by the base station (100/200 of FIGS. 19 to 23) in the above-described step S1820 may be implemented by a device as illustrated in FIGS. 19 to 23 described below. For example, referring to FIG. 20, one or more processors 102 may control one or more transceivers 106 and/or one or more memories 104 to transmit the second configuration information, and one or more transceivers 106 may transmit the second configuration information.

The base station may transmit a reference signal to the first UE (S1830). For example, the reference signal may be a CSI-RS. The reference signal may be transmitted periodically, aperiodically or semi-persistently.

For example, the operation of transmitting the reference signal by the base station (100/200 of FIGS. 19 to 23) in the above-described step S1830 may be implemented by a device as illustrated in FIGS. 19 to 23 described below. For example, referring to FIG. 20, one or more processors 102 may control one or more transceivers 106 and/or one or more memories 104 to transmit the reference signal, and one or more transceivers 106 may transmit the reference signal.

The base station may receive the CSI report from the first UE (S1840). For example, the CSI report may include a report on the CLI, and the report content for the CLI may include at least one of cross-link interference (CLI)-related CQI, CLI-related interference to noise ratio (INR), CLI-related RSRP or CLI-related indicator. Alternatively, the report on the measured cross-link interference may include a reference signal received power (RSRP) or a reception signal strength indicator (RSSI) for the cross-link interference.

For example, the CSI report may be received periodically, aperiodically or semi-persistently. For example, the CSI report including the CLI report and the CSI report including no CLI report may be configured to have different time domain behaviors.

For example, the operation of receiving the CSI report by the base station (100/200 of FIGS. 19 to 23) in the above-described step S1840 may be implemented by a device as illustrated in FIGS. 19 to 23 described below. For example, referring to FIG. 20, one or more processors 102 may control one or more transceivers 106 and/or one or more memories 104 to receive the CSI report, and one or more transceivers 106 may receive the CSI report.

As mentioned above, the above-described base station/UE signaling and operation (e.g., proposal 1/proposal 2/proposal 3/FIG. 16/FIG. 17/FIG. 18) may be implemented by the device (e.g., FIGS. 19 to 23) described below. For example, the base station may correspond to a first wireless device, and the UE may correspond to a second wireless device and, in some cases, vice versa.

For example, the above-described base station/UE signaling and operations (e.g., proposal 1/proposal 2/proposal 3/FIG. 16/FIG. 17/FIG. 18) may be processed by one or more processors (e.g., 102 and 202) of FIGS. 19 to 23, and the above-described base station/UE signaling and operations (e.g., proposal 1/proposal 2/proposal 3/FIG. 16/FIG. 17/FIG. 18) may be stored in the form of instructions/program (e.g., instructions or executable code) for driving at least one processors (e.g., 102 and 202) of FIGS. 19 to 23, in one or more memories (e.g., 104 and 204).

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 19 illustrates a communication system (1) applied to the present disclosure.

Referring to FIG. 19, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 1010x and the BS 200} and/or {the wireless device 1010x and the wireless device 1010x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

FIG. 21 illustrates a signal processing circuit for a transmit signal.

Referring to FIG. 21, a signal processing circuit 1000 may include a scrambler 1010, a modulator 200, a layer mapper 1030, a precoder 1040, a resource mapper 1050, and a signal generator 1060. Although not limited thereto, an operation/function of FIG. 18 may be performed by the processors 102 and 202 and/or the transceivers 106 and 206 of FIG. 20. Hardware elements of FIG. 21 may be implemented in the processors 102 and 202 and/or the transceivers 106 and 206 of FIG. 20. For example, blocks 1010 to 1060 may be implemented in the processors 102 and 202 of FIG. 20. Further, blocks 1010 to 1050 may be implemented in the processors 102 and 202 of FIG. 20 and the block 1060 of FIG. 20 and the block 2060 may be implemented in the transceivers 106 and 206 of FIG. 20.

A codeword may be transformed into a radio signal via the signal processing circuit 1000 of FIG. 21. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 200. A modulation scheme may include pi/2-BPSK(pi/2-Binary Phase Shift Keying), m-PSK(m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 21. For example, the wireless device (e.g., 100 or 200 of FIG. 20) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 22 illustrates another example of a wireless device applied to the present disclosure. The wireless device may be implemented in various forms according to a use-case/service (see FIG. 22).

Referring to FIG. 22, wireless devices 1010 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 20. For example, the transceiver(s) 114 may include the one or more transceivers 106 and 106 and/or the one or more antennas 108 and 108 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

FIG. 23 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 23, a portable device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 22, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140*a* may supply power to the portable device 100 and include a wired/wireless charging circuit, a battery, and the like. The interface unit 140*b* may support a connection between the portable device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Here, the wireless communication technology implemented in the wireless devices 100 and 200 of the disclosure may include the narrowband Internet of Things for low-power communication as well as LTE, NR, and 6G. In this case, e.g., the NB-IoT technology may be an example of low power wide area network (LPWAN) technology, and may be implemented in standards, such as LTE Cat NB1 and/or LTE Cat NB2, and it is not limited to the above-mentioned name. Additionally or alternatively, the wireless communication technology implemented in the wireless devices 100 and 200 of the disclosure may perform communication based on LTE-M technology. In this case, as an example, the LTE-M technology may be an example of LPWAN technology, and may be called by various names, such as enhanced machine type communication (eMTC). For example, LTE-M technology may be implemented as at least any one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100 and 200 of the disclosure may include at least any one of ZigBee, Bluetooth, and Low Power Wide Area Network (LPWAN) considering low power communication, and it is not limited to the above-mentioned name. For example, the ZigBee technology may create personal area networks (PAN) related to small/low-power digital communication based on various standards, such as IEEE 802.15.4, and it may be called by various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL AVAILABILITY

Although the method of transmitting and receiving PDSCH in the wireless communication system of the present disclosure has been described in connection with examples in which it applies to 3GPP LTE/LTE-A system and 5G systems (new RAT systems), the method is also applicable to other various wireless communication systems.

What is claimed is:

1. A method of a user equipment, UE, for reporting a channel state information, CSI, in a wireless communication system, the method comprising:
receiving, from a base station, configuration information related to the CSI;
receiving, from the base station, a reference signal based on the configuration information;
measuring a cross link interference, CLI;
transmitting, to the base station, the CSI; and
wherein the configuration information includes a first configuration regarding CSI resources and a second configuration including pattern information of resources for measuring the CLI, wherein a starting position of a sub carrier of the resources for measuring the CLI is determined based on the pattern information.

2. The method of claim 1,
wherein the CSI includes a report on the measured CLI, and
the configuration information includes information related to the CLI.

3. The method of claim 1,
wherein the resources for measuring the CLI, in frequency domain, are located from the starting position, in a form of comb 2 or comb 4.

4. The method of claim 1,
wherein the second configuration further includes information on density of the resources for measuring the CLI, and
the number of times the pattern of the resources for the measuring CLI is repeated is determined based on the density information.

5. The method of claim 4,
wherein the pattern is repeated at a specific interval in time domain, based on the density information.

6. The method of claim 5,
wherein the specific interval is 1 or −1.

7. The method of claim 5, further comprising:
receiving information regarding the specific interval.

8. The method of claim 1,
wherein the second setting further includes information of resources for measuring background noise and interference,
(i) the resources for measuring the CLI and (ii) the resources for measuring the background noise and the interference are not overlapped.

9. The method of claim 2,
wherein the report on the measured CLI includes a reference signal received power, RSRP, or a received signal strength indicator, RSSI, for the CLI.

10. The method of claim 1,
wherein the configuration information further includes a parameter for indicating contents of the report on the CLI.

11. The method of claim 10,
wherein, based on the parameter, the contents of report regarding at least one of a channel quality indicator, CQI, related to the CLI, an interference to noise ratio, INR, related to the CLI, a reference signal received power, RSRP, related to the CLI and/or an indicator related to the CLI, are indicated.

12. The method of claim 11,
wherein the report on the CLI including the at least one report contents is transmitted periodically, semi-continuously, or aperiodically.

13. The method of claim 1,
wherein the CLI is an interference generated by uplink transmission of other UE based on the reference signal is received.

14. In a user equipment, UE, reporting a channel state information, CSI, in a wireless communication system, the UE comprises:
at least one transceiver;
at least one processor, and
at least one memory coupled to the at least one processor, and storing instructions for operations executed by the at least one processor,
wherein the operations include,
receiving, from a base station, configuration information related to the CSI;
receiving, from the base station, a reference signal based on the configuration information;
measuring cross link interference, CLI;
transmitting, to the base station, the CSI; and
wherein the configuration information includes a first configuration regarding CSI resources and a second configuration including pattern information of resources for measuring the CLI,
wherein a starting position of a sub carrier of the resources for measuring the CLI is determined based on the pattern information.

15. A method of a base station, BS, for receiving a channel state information, CSI, in a wireless communication system, the method comprising:
transmitting, to a first user equipment, UE, first configuration information related to CSI;
transmitting, to a second UE, second configuration information;
transmitting, to the first UE, a reference signal; and
receiving, from the first UE, CSI including a report on cross link interference, CLI,
wherein the first configuration information includes information related to CLI;
wherein the second configuration information includes pattern information of resources for measuring the CLI,
wherein a starting position of a sub carrier of the resources for measuring the CLI is determined based on the pattern information.

16. The method of claim 15,
wherein the CSI includes a report on the measured CLI, and
the configuration information includes
information related to the CLI.

17. The method of claim 16,
wherein the report on the measured CLI includes a reference signal received power, RSRP, or a received signal strength indicator, RSSI, for the CLI.

* * * * *